US012799348B2

(12) United States Patent
Cirak et al.

(10) Patent No.: US 12,799,348 B2
(45) Date of Patent: Nov. 17, 2026

(54) PHOTONIC LACQUERING OF WIRES

(71) Applicant: ASTA Energy Solutions GmbH, Oed (AT)

(72) Inventors: Suljo Cirak, Oed (AT); Bernd Strehmel, Krefeld (DE); Sascha Driesen, Hilden (DE)

(73) Assignee: ASTA ENERGY SOLUTIONS AG, Oed (AT)

( * ) Notice: Subject to any disclaimer, the term of this patent is extended or adjusted under 35 U.S.C. 154(b) by 768 days.

(21) Appl. No.: 18/266,495

(22) PCT Filed: Dec. 10, 2021

(86) PCT No.: PCT/EP2021/085205
§ 371 (c)(1),
(2) Date: Jun. 9, 2023

(87) PCT Pub. No.: WO2022/123014
PCT Pub. Date: Jun. 16, 2022

(65) Prior Publication Data

US 2024/0052193 A1 Feb. 15, 2024

(30) Foreign Application Priority Data

Dec. 11, 2020 (EP) .................................... 20213339

(51) Int. Cl.

| | |
|---|---|
| ***C09D 129/14*** | (2006.01) |
| ***C09B 23/08*** | (2006.01) |
| ***C09B 67/20*** | (2006.01) |
| ***C09D 7/41*** | (2018.01) |
| ***H01B 3/44*** | (2006.01) |
| ***H01B 13/00*** | (2006.01) |
| ***H01B 13/06*** | (2006.01) |
| *C08K 5/00* | (2006.01) |
| *C08K 5/3417* | (2006.01) |
| *C08K 5/42* | (2006.01) |
| *C08K 5/435* | (2006.01) |
| *C08K 5/49* | (2006.01) |
| *C08K 5/55* | (2006.01) |

(52) U.S. Cl.
CPC .......... *C09D 129/14* (2013.01); *C09B 23/083* (2013.01); *C09B 67/0063* (2013.01); *C09D 7/41* (2018.01); *H01B 3/446* (2013.01); *H01B 13/003* (2013.01); *H01B 13/065* (2013.01); *C08K 5/0091* (2013.01); *C08K 5/3417* (2013.01); *C08K 5/42* (2013.01); *C08K 5/435* (2013.01); *C08K 5/49* (2013.01); *C08K 5/55* (2013.01)

(58) Field of Classification Search
None
See application file for complete search history.

(56) References Cited

U.S. PATENT DOCUMENTS

| | | | | |
|---|---|---|---|---|
| 8,168,711 B2 * | 5/2012 | Mamak | .................. | B29C 65/16 252/62 |
| 2007/0031672 A1 | 2/2007 | Boehm et al. | | |
| 2010/0310787 A1 | 12/2010 | Lehmann et al. | | |

FOREIGN PATENT DOCUMENTS

| | | | |
|---|---|---|---|
| DE | 10357360 | A1 | 7/2005 |
| JP | 2017134951 | A | 8/2017 |
| WO | 2006088272 | A1 | 8/2006 |
| WO | 2011015447 | A1 | 2/2011 |

OTHER PUBLICATIONS

International Written Opinion for corresponding International Patent Application No. PCT/EP2021/085205, dated Jun. 13, 2023.
International Search Report for corresponding International Patent Application No. PCT/EP2021/085205, dated Mar. 21, 2022.
Brömme T et al., New lodonium Salts in NIR Sensitized Radical Photopolymerization of Multifunctional Monomers, RSC Advances, 2015, vol. 5, No. 86, pp. 69915-69924.
Kocaarslan A et al., Near-IR and UV-LED Sensitized Photopolymerization with Onium Salts Comprising Anions of Different Nucleophilicities, ChemPhotoChem., 2019, vol. 3, No. 11, pp. 1127-1132.
Kütt A et al., Equilibrium Acidities of Superacids, J of Organic Chemistry, 2011, vol. 76, No. 2, pp. 391-395.
Pang Y et al., NIR-Sensitized Activated Photoreaction between Cyanines and Oxime Esters: Free-Radical Photopolymerization, Angew. Chem. Int. Ed., 2020, vol. 59, No. 28, pp. 11440-11447.
Schmitz C et al., Angew. New High-Power LED Opens Photochemistry for Near Infrared Sensitized Radical and Cationic Photopolymerization, Chem. Int. Ed., 2019, vol. 58, No. 13, pp. 4400-4404.
Schmitz C et al., NIR-Sensitized Photoinitiated Radical Polymerization and Proton Generation with Cyanines and LED Arrays, Progress in Organic Coatings, 2016, vol. 100, pp. 32-46.
Schmitz C and Strehmel B, Photochemical Treatment of Powder Coatings and VOCFree Coatings with NIR Lasers Exhibiting Line-Shaped Focus: Physical and Chemical Solidification, ChemPhotoChem, 2017, vol. 1, pp. 26-34.

(Continued)

*Primary Examiner* — Sanza L. McClendon
(74) *Attorney, Agent, or Firm* — LOZA & LOZA, LLP; Michael F. Fedrick

(57) ABSTRACT

The present invention relates to a wire coating composition comprising an infrared radiation sensitive compound resulting in the conversion of absorbed light energy into heat and a matrix with a varnish that responses either chemically or physically upon treatment with heat, to a method of producing an enameled wire and to the use thereof.

18 Claims, 8 Drawing Sheets

(56) References Cited

OTHER PUBLICATIONS

International Search Report for International Patent Application No. PCT/EP2021/085205, dated May 25, 2022.
International Written Opinion for International Patent Application No. PCT/EP2021/085205, dated May 25, 2022.
Office Action issued on Oct. 14, 2025 for counterpart Japanese Patent Application No. 2023-559153, 6 pages.

* cited by examiner

Fig. 2 cont':
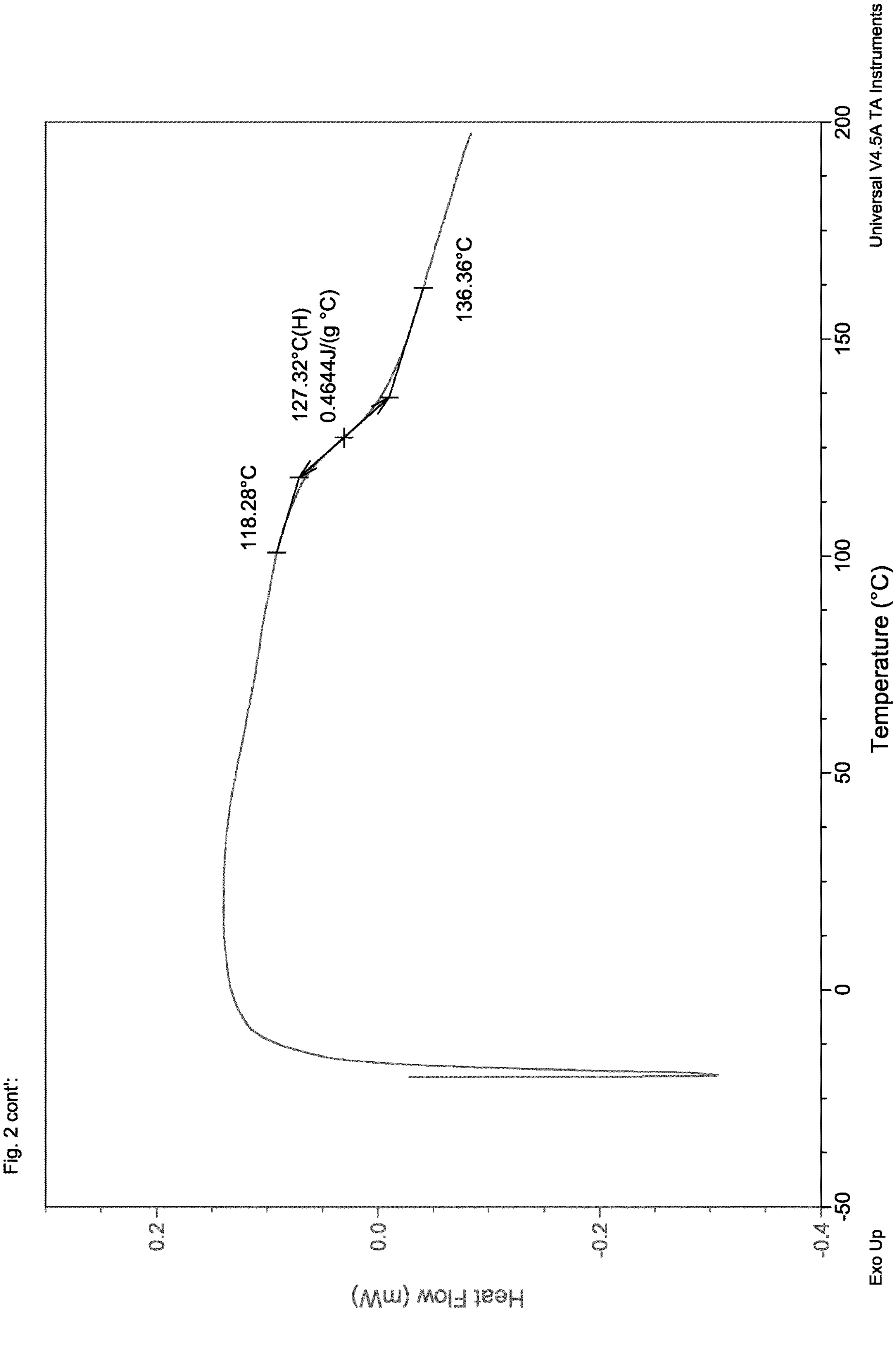

PHOTONIC LACQUERING OF WIRES

CROSS-REFERENCE TO RELATED APPLICATIONS

This application is the U.S. national stage of International Patent Application No. PCT/EP2021/085205, filed on Dec. 10, 2021 and entitled PHOTONIC LACQUERING OF WIRES, which claims the benefit of priority under 35 U.S.C. § 119 from European Patent Application No. 20213339.3, filed on Dec. 11, 2020. The disclosures of the foregoing applications are incorporated herein by reference in their entireties.

FIELD OF THE INVENTION

The present invention relates to lacquers for coated wires and methods for lacquering the same.

BACKGROUND ART

An enameled wire may be wound in a coiled form in the inside of an electric apparatus, and functions to interconvert electrical energy and mechanical energy by means of a conversion process of magnetic energy. Such an enameled wire is generally composed of a conducting wire such as copper and aluminum round and flat wires and an insulated coating layer surrounding the conducting wire. The coating layer is cured onto the wire with heat. The resulting coating's main function is electrical insulation. The insulation is typically made of tough polymer film materials rather than vitreous enamel, as the name might suggest.

The coating varies depending on the use of the wires. Some wires may be extremely small in the range of micrometers. Whereas in heavy electric motors the diameter of round or flat wires can be up to several millimeters.

The wire coating may be applied in different modes depending on the shape and diameter of the wire to be coated. Horizontal or vertical application, or application with dies or with felts, are typical wire coating methods.

Enameled wires are widely used in various electric facilities and are basically composed of metal wires and insulation coating layer(s) surrounding the wires. Such enameled wires are used in various industrial fields such as heavy electric apparatuses, automotive parts, household appliances, medical appliances, and core materials in the aerospace industries, etc.

Currently used coatings consists of polyurethane, polyester, polyesterimide, polyamide-imide, or polyvinyl formal. Usually, the coating layer is provided by applied repeatedly on the surface of wire. The coating composition may be applied by spraying, by a roller, by die or by felt.

An enameled wire is conventionally prepared by coating the wire with one or more coating layers of flowable resin materials, drying and curing the resin materials. For drying and curing the layer the coated wire is fed into a furnace which consist of a heated chamber (horizontally or vertically arranged) where the solvent is evaporated before moving into a higher temperature zone (400-700 °C) where the film is cured. The wire may then go back into the coating circuit for an additional layer of coating. In this continuous process, up to 30 applications of enamel may be applied until the desired layer thickness is obtained.

WO2006088272A1 discloses an enamel varnish composition for enameled wires. The varnish composition comprises polyamide-imide resins component included in an organic solvent.

US2010310787A1 relates to the use of tungsten oxide or of tungstate to increase the heat-input amount of near infrared radiation in various processes, e.g., for laser welding of plastics, NIR curing of coatings, drying of printing inks, fixing of ink toners to a substrate, heating of plastic preforms, laser marking of plastics or paper. Various acrylic resins are used in the coating formulations for e.g., laser welding of plastics. However, the acrylic resins used in US2010310787A1 are not suited as insulating varnishes.

A combination of NIR absorbers and an iodonium salt as co-initiator in combination with NIR-LEDs for NIR sensitized photopolymerization of acrylic esters is described in Schmitz C., et al (Progress in Organic Coatings 100 (2016) 32-46). Cyanines are used as preferred NIR absorbers due to their flexibility to change the structural pattern compared to other sensitizers such as rylenes.

The currently used wire coating processes require high energy resources and appropriate equipment such as furnaces. Therefore, it is desirable to develop wire coating compositions which can be applied and cured by less energy consumption and decent equipment, e.g., avoiding the use of furnaces. Furnaces also interfere inline production because the release of heat typically occurs inhomogeneous with no static distribution in space. In addition, maintenance work requires to wait until the equipment cools down to a temperature that makes possible to begin with maintenance works. Furthermore, it requires also considerable amount on time to warm-up the equipment until an approximately constant process temperature would be available for production. These disadvantages result in a significant loss on production time, which is not desired particularly for production facilities working according to lean-manufacturing conditions.

SUMMARY OF INVENTION

It is the object of the invention to provide a cost-efficient method for coating and insulating wires. It is a further object of the invention to provide an insulating wire coating composition, which is applied to the wire and cured by irradiation.

The object is solved by the subject-matter as claimed and as described herein.

Specifically, the present invention provides a method for coating and insulating a wire comprising the following steps:

a) coating the wire by applying a coating composition which comprises an infrared radiation sensitive compound having a maximum absorption in a range of 700 nm to 2,000 nm in wavelength and a matrix which comprises an insulating wire varnish, b) exposing the coated wire to an irradiation source, and c) curing the wire coating to provide an enameled wire.

One embodiment of the invention relates to the method as described herein, wherein steps a) to c) are repeated until the desired enamel thickness is achieved.

A further embodiment relates to the method as described herein, wherein the irradiation source for exposure comprises a semiconductor emitting in the spectral range of 700 nm to 2,000 nm in wavelength. The irradiation source may be selected from semiconductor lasers and high-power LED devices.

A further embodiment relates to the method as described herein, wherein the infrared radiation sensitive compound is selected from the group consisting of polymethines, rylenes, porphyrines, and/or oxonoles.

One embodiment of the invention relates to the method as described herein, wherein the polymethine is a compound of formula (I), (II), (III), or (IV), (I)

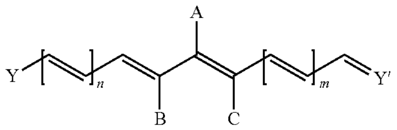

$X^-$ (II)

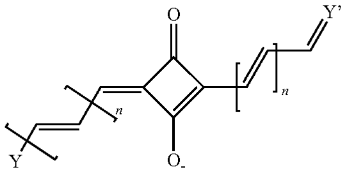

(III)

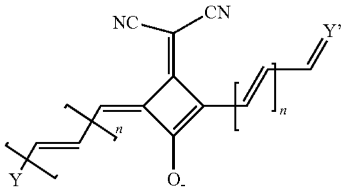

(IV)

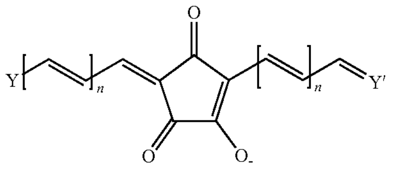

wherein

Y is selected from (V)

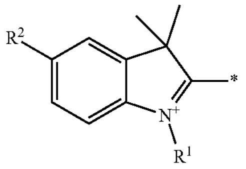

(VI)

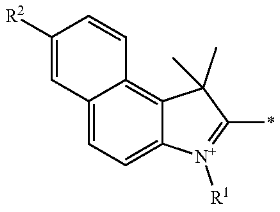

(VII)

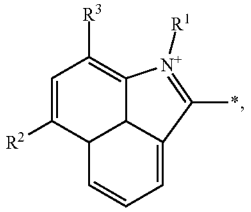

Y' is selected from (VIII)

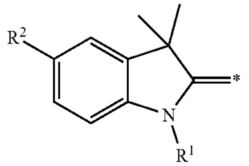

(IX)

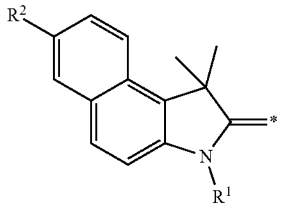

(X)

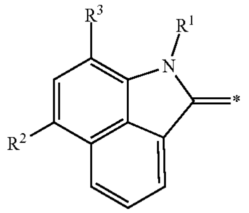

A denotes H, $C_{1-6}$alkyl, O—$C_{1-6}$alkyl, barbituryl, aryl, $N(Ph)_2$, S-phenyl, B and C independently from each other denote H, $C_{1-6}$alkyl, $C_{2-6}$alkenyl; or B and C together form a 5- or 6-membered carbocycle, $R^1$, $R^2$, and $R^3$ independently from each other denote H, $C_{1-3}$alkyl, m and n independently from each other denote 0, 1, or 2, and $X^-$ denotes a counter anion.

A further embodiment relates to the method as described herein, wherein the polymethine compound of formula (I), (II), (III), or (IV) exhibits a solubility in the matrix of at least 0.5 g/L at room temperature.

A further embodiment relates to the method as described herein, wherein the insulating wire varnish is selected from the group consisting of polyester, THEIC-modified polyester, polyester imide, polyamide imide, polyimide, polyamide, polyurethanes, polyvinyl formal, epoxy, acrylic resin, methacrylic resin, melamine resin, phenolic resin and/or alkyd resin-based paint. Specifically, the insulating wire varnish provides for a breakdown voltage of at least 2 kV of the enameled wire.

According to one embodiment of the invention, solidification of the coating composition is affected by variation of the substitution pattern of the polymethine and/or by variation of the counter-anion.

Specifically, the present invention provides an insulating wire coating composition comprising an infrared radiation sensitive compound having a maximum absorption in a range of 700 nm to 2,000 nm in wavelength and a matrix comprising an insulating wire varnish.

One embodiment of the invention relates to a wire coating composition comprising an infrared radiation sensitive compound having a maximum absorption in a range of 700 nm to 2,000 nm in wavelength and a matrix comprising a varnish.

A further embodiment relates to the wire coating composition as described herein, wherein the infrared radiation sensitive compound is selected from the group consisting of polymethines, rylenes, porphyrines, oxonoles, and carbon nanodots.

A further embodiment relates to the wire coating composition as described herein, wherein the polymethine is a compound of formula (I)

(I)

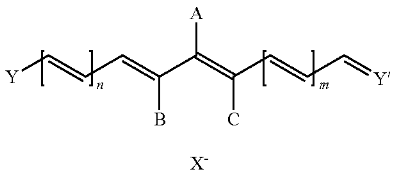

(II)

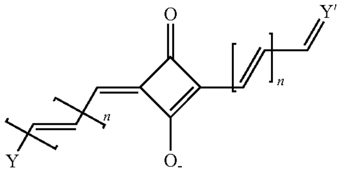

(III)

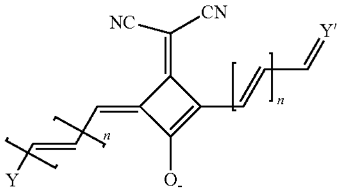

(IV)

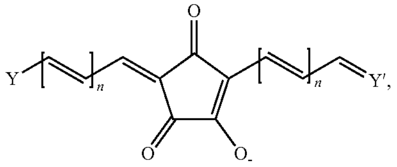

wherein

Y is selected from (V)

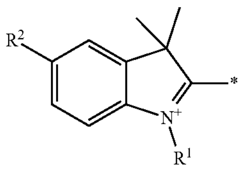

(VI)

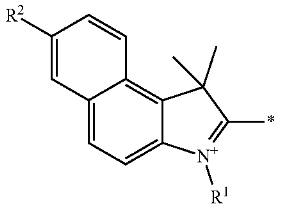

-continued (VII)

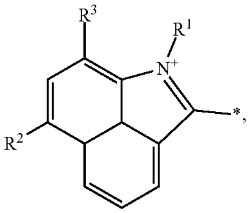

Y' is selected from (VIII)

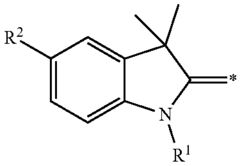

(IX)

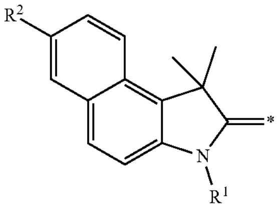

(X)

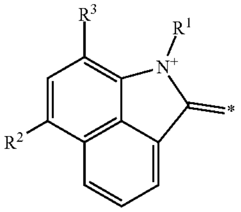

A denotes H, $C_{1-6}$alkyl, O—$C_{1-6}$alkyl, barbituryl, aryl, $N(Ph)_2$, S-phenyl, B and C independently from each other denote H, $C_{1-6}$alkyl, $C_{2-6}$alkenyl; or B and C together form a 5- or 6-membered carbocycle, $R^1$, $R^2$, and $R^3$ independently from each other denote H, $C_{1-3}$alkyl, m and n independently from each other denote 0, 1, or 2, and $X^-$ denotes a counter anion.

Another embodiment relates to the wire coating composition as described herein, wherein the polymethine compound of formula (I), (II), (III), or (IV) exhibits a solubility in the matrix of at least 0.5 g/L at room temperature.

A further embodiment relates to the wire coating composition as described herein, comprising a mixture of at least two infrared radiation sensitive compounds.

A further embodiment relates to the wire coating composition as described herein, wherein the insulating wire varnish is a solid or liquid wire varnish. The varnish may be selected from the group consisting of polyester, THEIC-modified polyester, polyester imide, polyamide imide, polyimide, polyamide, polyurethanes, polyvinyl formal, epoxy, acrylic resin, methacrylic resin, melamine resin, phenolic resin and/or alkyd resin-based paint. Specifically, the insulating wire varnish provides for a breakdown voltage of at least 2 kV of the enameled wire.

A further embodiment relates to the wire coating composition as described herein, further comprising about 0.001% to about 80% of a volatile substance.

A further embodiment relates to the wire coating composition as described herein, wherein the volatile substance is an aliphatic or aromatic carbohydrate compound.

One embodiment of the invention relates to an enameled wire comprising a cured coating composition as describe herein.

A further embodiment relates to the wire as described herein, wherein the specification of the cured coating composition is adapted by variation of the substitution pattern of the polymethine and/or by variation of the counter-anion.

One embodiment of the invention relates to the use of the coated wire in the electronics, automotive, aircraft, and/or adhesive industry.

DESCRIPTION OF EMBODIMENTS

Figure 1:
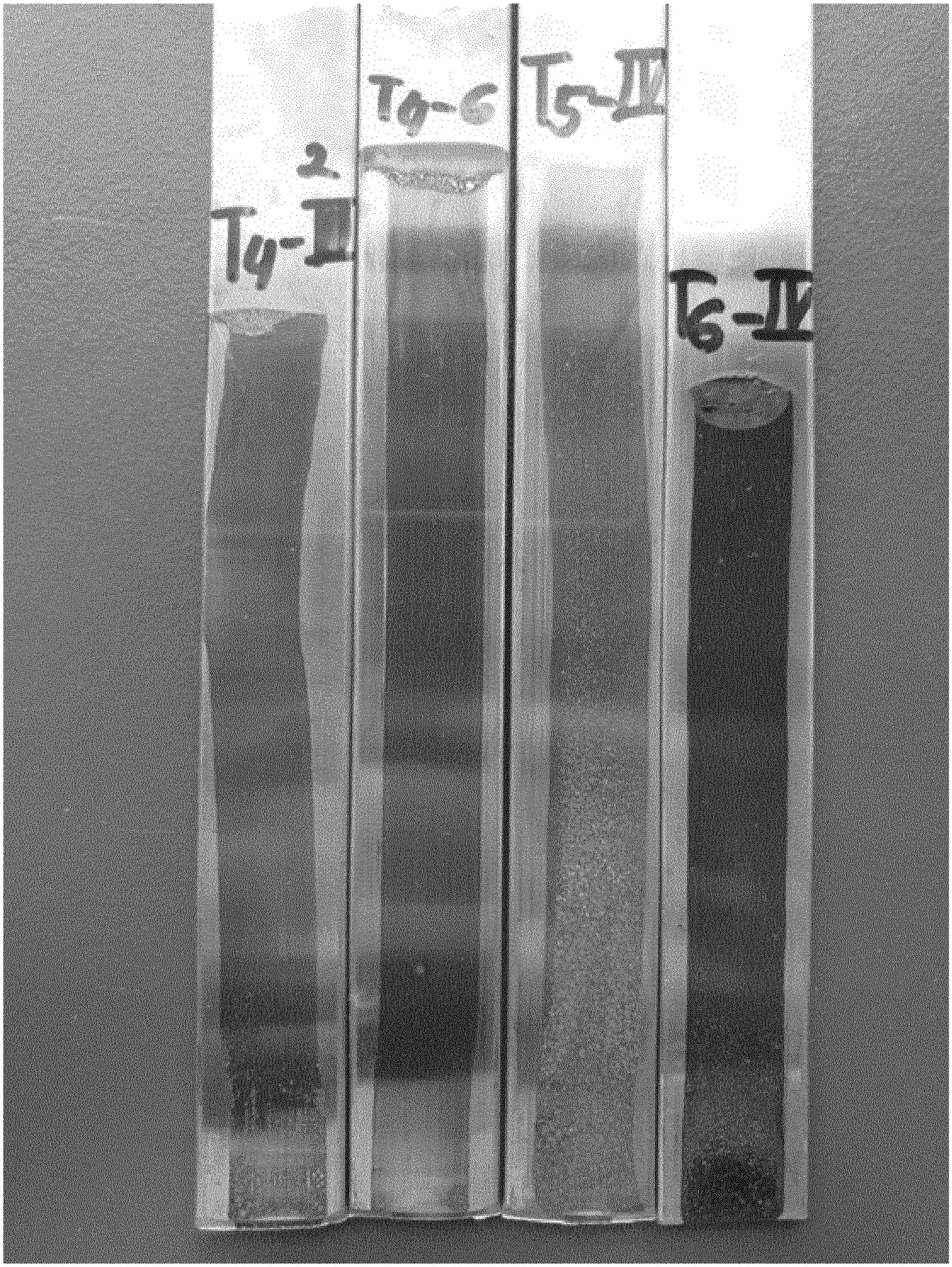
FIG. 1: Coated wire applying photonic drying by the use of NIR laser emitting at 980 nm with line-shaped focus (31×1.8 mm) exhibiting a power of 300 W. Different absorber concentrations were applied (T5-IV: 0.25 wt-%, T4-II: 0.5 wt-%, T4-VI: 0.5 wt-%, T6-IV: 1 wt-%)

The present invention relates to a wire coating composition comprising an infrared radiation sensitive compound and a matrix with a varnish, to a method of producing an enameled wire and to the use thereof.

As used herein, the "infrared radiation sensitive compound" or "absorber" refers to a compound which exhibits an absorption maximum of about 700 nm to 2,000 nm. Suitable absorber compounds may be selected from the group consisting of polymethines, rylenes, porphyrines, or carbon nanodots.

The polymethine may be a compound of formula (I), (II), (III), or (IV)

(I)

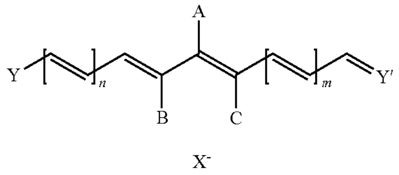

(II)

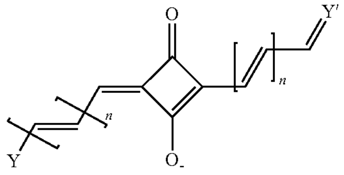

(III)

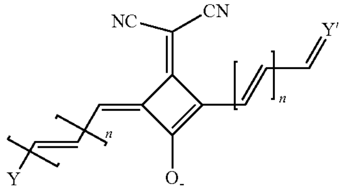

(IV)

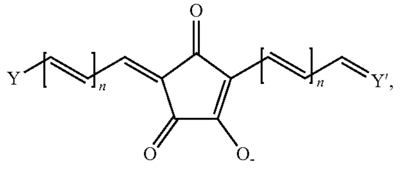

wherein

Y is selected from (V)

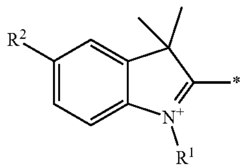

(VI)

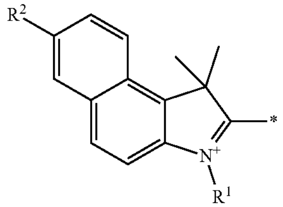

-continued

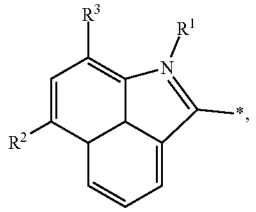

Y' is selected from

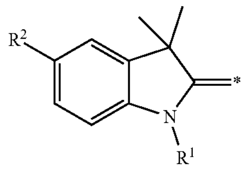

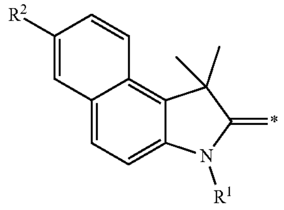

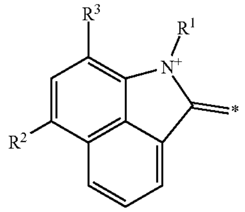

A denotes H, $C_{1-6}$alkyl, O—$C_{1-6}$alkyl, barbituryl, aryl, $N(Ph)_2$, S-phenyl, B and C independently from each other denote H, $C_{1-6}$alkyl, $C_{2-6}$alkenyl; or B and C together form a 5- or 6-membered carbocycle, $R^1$, $R^2$, and $R^3$ independently from each other denote H, $C_{1-3}$alkyl, m and n independently from each other denote 0, 1, or 2, and $X^-$ denotes a counter anion.

The polymethine may be a compound selected from the group consisting of

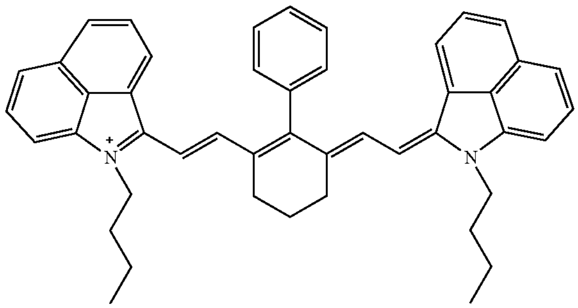

-continued (VII)

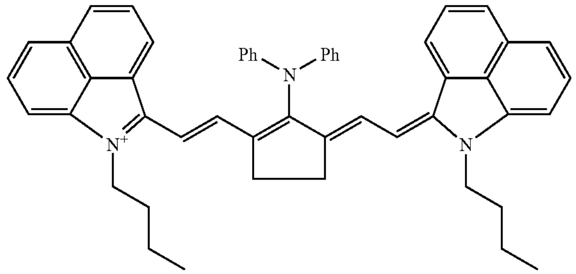

(VIII)

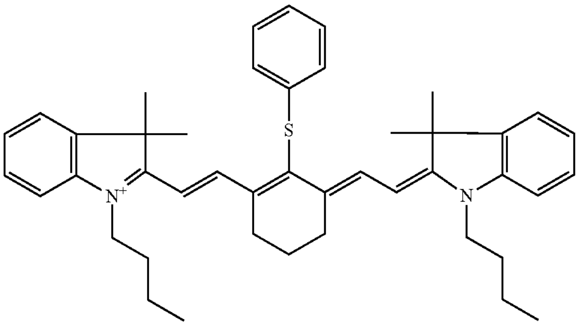

(IX)

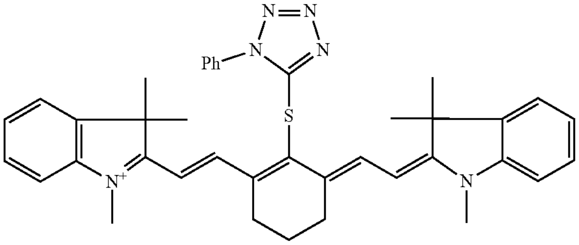

(X)

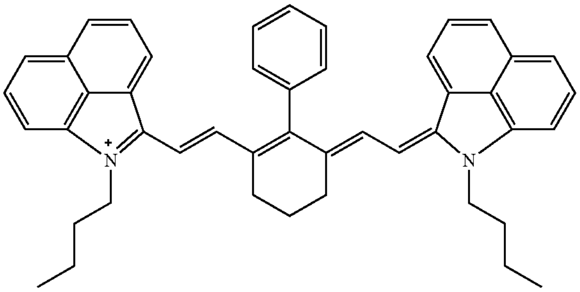

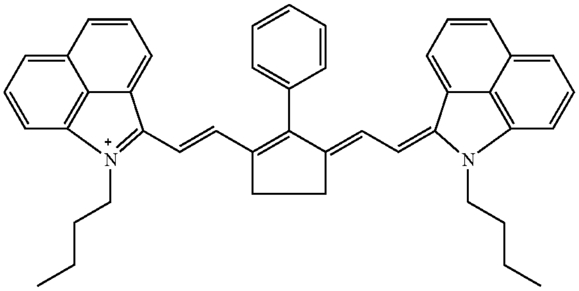

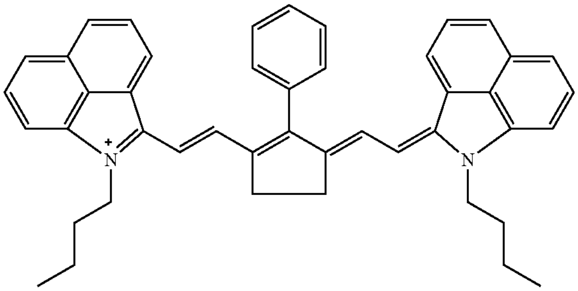

-continued
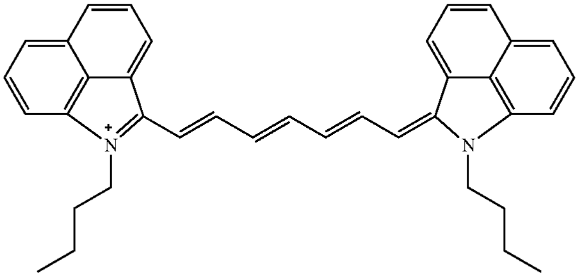
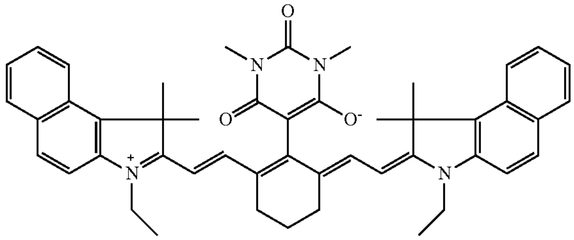
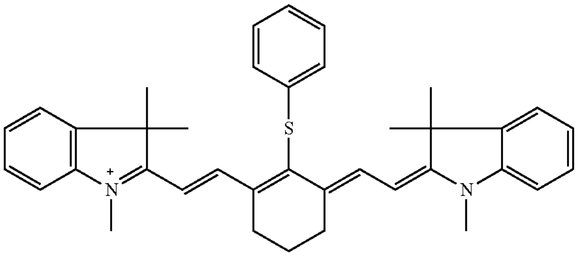
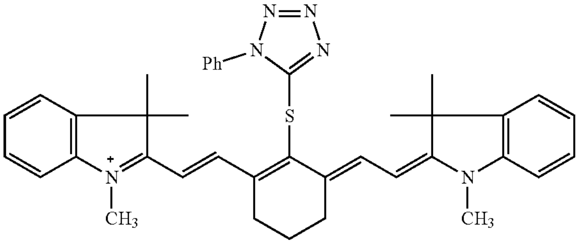
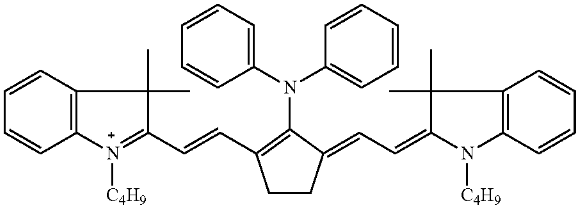
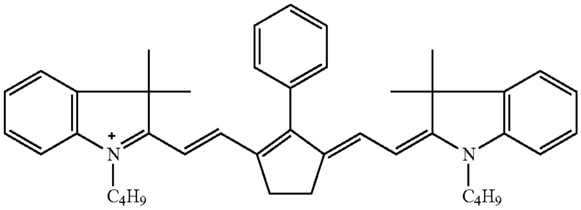
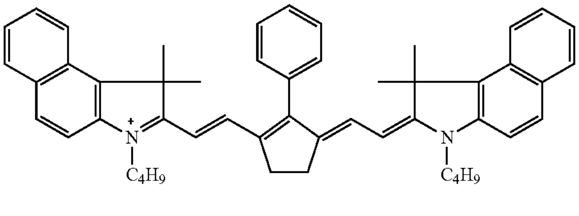
-continued
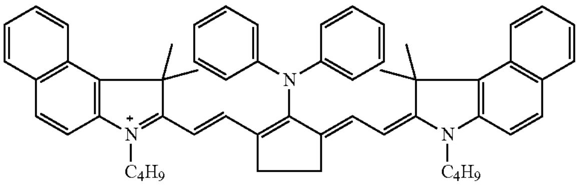
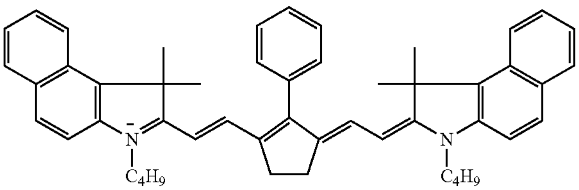
The polymethine comprising a counterion may be a compound selected from the group consisting of
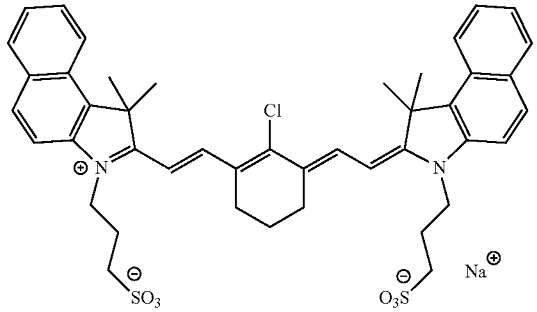
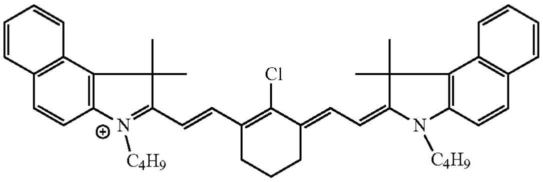
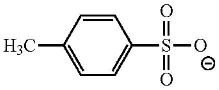
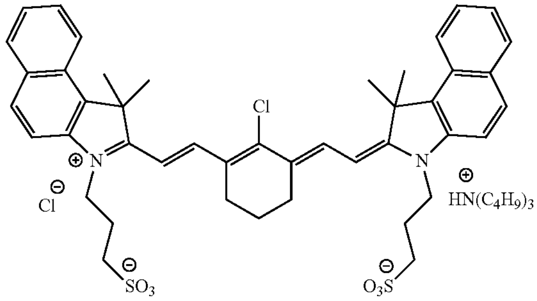
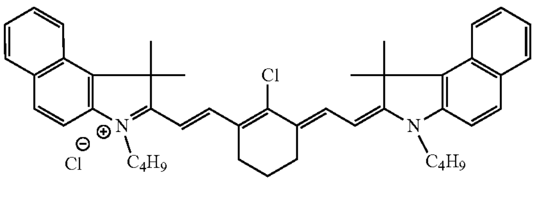

-continued

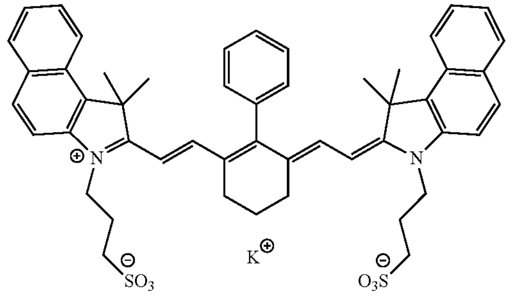

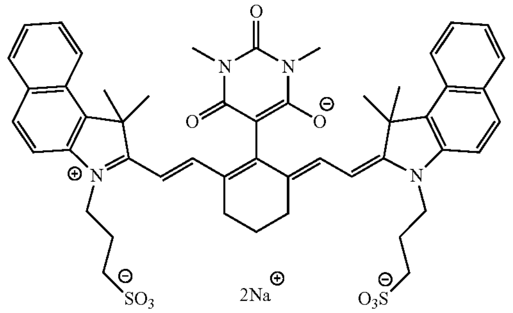

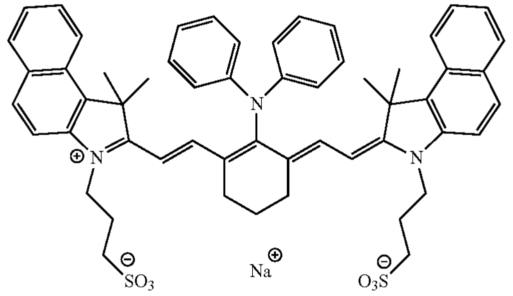

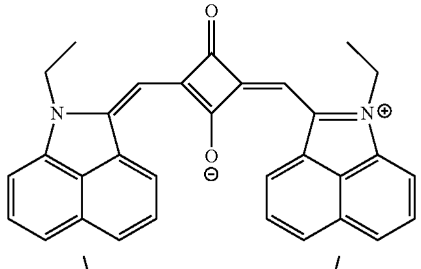

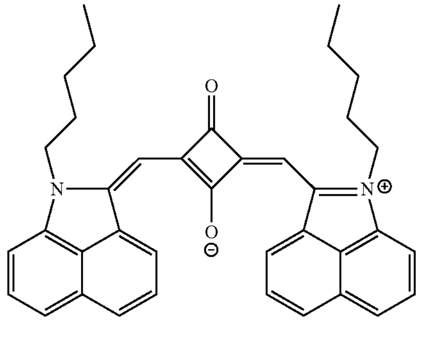

-continued

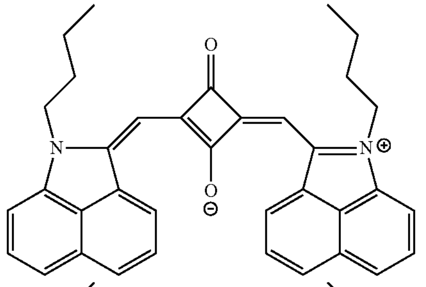

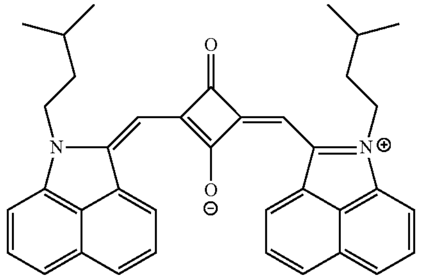

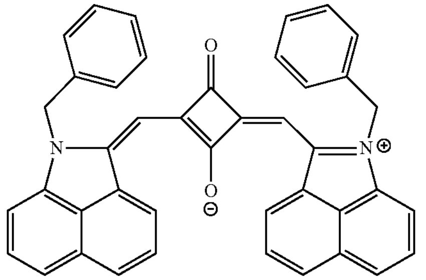

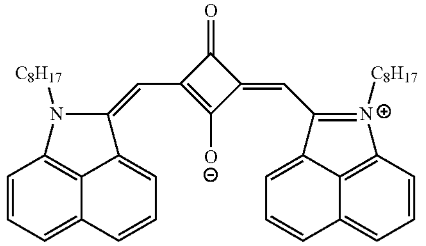

The counterion is a negatively charged group associated with a positively charged polymethine. The anionic counterion may be monovalent (i.e., including one formal negative charge). An anionic counterion may also be multivalent (i.e., including more than one formal negative charge), such as divalent or trivalent. Exemplary counterions include halide ions (e.g., $F^-$, $Cl^-$, $Br^-$, $I^-$), $NO_3^-$, $ClO_4^-$, $O^-$, $HPO_4^-$, $HCO_3^-$, $HSO_4^-$, $HSO_3^-$, sulfonate ions (e.g., methansulfonate, trifluoromethanesulfonate, 4-dodecylbenzenesulfonate, and the like), carboxylate ions (e.g., acetate, propanoate, benzoate, and the like), $BF_4^-$, $PF_6^-$, or $BPh_4^-$, bis(trifluoromethanesulfonyl)imide ($[(CF_3SO_2)_2N]^-$), tetra (perfluoroalkoxy)aluminate for which [Al(O-t-C4F9)]-] represents one example, tetra(pentafluorophenyl)borate, or tris (pentafluoroethyl)trifluorophosphate ($[PF_3(C_2F_5)_3]^-$).

Unless specified otherwise, the term “alkyl”, when used alone or in combination with other groups or atoms, refers to a saturated straight or branched chain consisting solely of 1 to 6 hydrogen-substituted carbon atoms, and includes methyl, ethyl, propyl, isopropyl, n-butyl, 1-methylpropyl, isobutyl, t-butyl, 2,2-dimethylbutyl, 2,2-dimethyl-propyl, n-pentyl, 2-methylpentyl, 3-methylpentyl, 4-methylpentyl, n-hexyl and the like.

Unless specified otherwise, the term "alkenyl" refers to a partially unsaturated straight or branched chain consisting solely of 2 to 6 hydrogen-substituted carbon atoms that contains at least one double bond, and includes vinyl, allyl, 2-methylprop-1-enyl, but-1-enyl, but-2-enyl, but-3-enyl, buta-1,3-dienyl, penta-1,3-dienyl, penta-2,4-dienyl, 2-methylbut-1-enyl, 2-methylpent-1-enyl, 4-methylpent-1-enyl, 4-methylpent-2-enyl, 2-methylpent-2-enyl, 4-methylpenta-1,3-dienyl, hexen-1-yl and the like.

Unless specified otherwise, the term "carbocycle" refers to a monocyclic group containing from 5 or 6 carbon atoms. The carbocyclic ring may be partially saturated and optionally be substituted with one or more, identical or different substituents. Examples of carbocycles include cyclopentenyl, cyclohexanyl, and the like.

The polymethine compound may also be a commercially available compound. Suitable polymethine absorber compounds are available from FEW Chemicals GmbH (Germany).

Rylenes are dyes based on the rylene framework of naphthalene units linked in peri-positions. In homologues additional naphthalene units are added, forming compounds—or poly(peri-naphthalene)s—such as perylene, terrylene and quaterrylene. Porphyrins are a group of heterocyclic macrocycle organic compounds, composed of four modified pyrrole subunits interconnected at their a carbon atoms via methine bridges.

In one embodiment, the absorber is a polymethine compound of Formula (I), (II), (III), or (IV). There exists also the possibility that the polymethine relates to oxonole based structures comprising the polymethine pattern in the molecular skeleton.

Wire enamels are applied on copper and aluminum round and flat wires used in motors, transformers, generators, automotive industry and electrical measuring instruments. They are cured onto the wires with heat. The main result of the resulting coating is electrical insulation. Wire enamels are also described as primary insulation. The coated wires are sometimes called "magnet wires".

In the literature or international standards those are described under different terms, for example electrical insulating varnishes or electrical insulation materials as well as wire enamels.

Electrical insulating varnishes have the task to isolate electrically conductive carrier materials, so they take over a special task under various varnishes. The electro isolation is a crucial function, which is necessary, in order to activate electric motors and transformers. The temperature resistance is additionally crucial for a safe continuous operation (Goldschmid A., Streitberger H-J., BASF-Handbuch Lackiertechnik. Vincentz: Hannover, 2002, ISBN: 3-87870-324-4, Page 771).

Electrical insulation materials isolate and consolidate carrier materials as wires, electronic components, engines, transformers, and machine components, generally without any demand on optical properties. Brock T, Groteklaes M., Mischke P., Lehrbuch der Lacktechnologie, Vincentz, Edition: 2, 1998, ISBN: 3-87870-569-7., Page 338).

In the DIN EN 60085:2008, the electrical isolation material (EIM) are defined as solid or liquid material, like wire enamels, with insignificant electrical conductivity or a simple combination of such materials, which are used to separate conductive parts with different electrical potentials in electrical devices. Through the wire enamels bare wires get an isolating surface.

The solid insulation materials could be used in the process like extrusion or as insulating paper.

For the estimation of the isolation properties of the materials, the measurement of the breakdown voltage will be used. That must be performed according to the IEC 60851-5, chapter 4. Some companies have defined their own values of the breakdown voltage, which must be fulfilled. For example, some companies require that the breakdown voltage must always be ≥2 kV and the test voltage increase must not exceed 100 V/s.

Besides the breakdown voltage, insulating materials must also have good thermal resistance properties. The standard DIN EN 60034-1 defines the thermal resistance of isolating materials. The temperatures given are the maximum values that the substances and materials can maximum resist without changing their texture.

There is no particular limitation on the varnish for the insulation, but any insulating varnish used for conventional enameled wires may be used. Examples of conventionally used insulating varnishes include: polyimide resin based insulating varnishes; polyesterimide resin based insulating varnishes; polyamide-imide resin based insulating varnishes; and Class H polyester resin based insulating varnishes. The insulation coating 3 around the conductor wire 1 and the outermost insulation coating 4 may be made from the same or different material.

According to one embodiment, the coating composition comprises an insulating varnish. Any synthetic varnish commonly used in enamel wires can be used in the coating composition. Examples of conventionally used insulating varnishes include, but are not limited to, modified or unmodified acetal of a polyaldehyde, polyurethane, polyester, THEIC-modified polyester, polyester imide, polyimide, polyamide imide, polyamide, polysulfone, polyimide resins, polyvinyl formal, epoxy, acrylic resin, methacrylic resin, melamine resin, phenolic resin and/or alkyd resin-based paints, or mixtures thereof. The selection of synthetic varnish depends on the required temperature resistance and insulation properties on the coating layers.

Specifically suitable varnishes are for example polyvinyl acetal-based insulating varnish systems. This varnish system is a reaction product of polyvinyl alcohol and aldehydes or ketones. Polyvinyl formal results from the reaction of formaldehyde with polyvinyl alcohol. The resulting polymer still has residual ester groups from the hydrolysis of the polyvinyl acetate to polyvinyl alcohol as well as free OH groups which have not reacted with the aldehydes. Crosslinking reactions may take place via these free OH groups.

The insulating varnishes useful in the present invention may be based on an unblocked and unprotected, or blocked or protected varnish moiety. Blocked or protected varnish moieties can be formed by reacting an unblocked and unprotected aldehyde moiety with a suitable blocking or protecting group. Examples of protecting or blocking groups for aldehyde groups are bisulfites (e.g., from reaction of an aldehyde with sodium bisulfite), dioxolanes (e.g., from reaction of an aldehyde with ethylene glycol), oximes (e.g., from reaction of an aldehyde with hydroxylamine), imines (e.g., from reaction of an aldehyde with methylamine).

In a further embodiment of the invention, cresol-blocked or phenol-blocked polyisocyanates, phenolic resins or urea resins and melamine resins may be used as crosslinkers. In addition, a single compound or a mixture thereof may be used as crosslinkers. The isocyanate component usually consists of an adduct of trimethylolpropane (TMP) and toluene diisocyanate (TDI), in which the free isocyanate functions are blocked by phenol or cresol. Resoles are usually used as phenolic resins, and hydroxymethyl derivatives of melamine (e.g., methyl or butyl ether) are usually used as melamine resins.

The coating composition may further comprise a volatile substance. As used herein, a "volatile substance" refers to a substance that vaporizes readily. Many organic compounds are volatile and may be used accordingly. In one embodiment of the disclosure the volatile substance is an aliphatic or aromatic carbohydrate compound such as for example, phenol, cresol, xylol, or N-methyl-2-pyrrolidone (NMP).

The volatile substance may be present in an amount of about 0.001 wt % to 85 wt %, or in amount of about 0.01 wt % to 70 wt %, or in amount of about 0.1 wt % to 50 wt %, or in amount of about 1 wt % to 30 wt %.

The compatibility of the coating composition to be solidified may depend on the substitution pattern of the polymethine and/or on the counter-anion. Thus, by varying the substitution pattern of the polymethine and of the counter-anion, different solidifying properties of the coating composition can be achieved. The bis(trifluoromethylsulphonyl) imide brought big progress to improve the solubility of iodonium salts in varnished as reported in *RSC Advances* 2015, (86): 69915-69924. Another alternative anion. Aluminate anions as disclosed in *ChemPhotoChem* 2019, 3(11): 1127-1132 depict another alternative. Moreover, fluorinated alkylphosphates such as the $[PF_3(C_2F_5)_3]^-$ anion exhibit an additional opportunity. DE10357360 A1 published as FAP-Farbstoffe shows possible alternatives. Further alternatives anions relate to long chain alkyl sulphonates (*ChemPhotoChem* 2017, 1(1): 26-34) leading to the conclusion that anions derived from weak coordinating anions as disclosed in *The Journal of Organic Chemistry* 2011, 76(2): 391-395 and *Angewandte Chemie* 2004, 116(16): 2116-2142 uptake a major function. Borates depict an additional option.

The coating composition may further comprise a coloring agent. The coloring agent may be an inorganic pigment that provides the desired color. Specifically, the coating composition comprises (a) a synthetic varnish, (b) an absorber compound, and optionally (c) an inorganic pigment, and (d) a volatile substance.

Suitable inorganic pigments are metal oxides such as titanium oxide, zinc oxide, ferric oxide, chromic oxide, aluminum oxide, magnesium oxide, silicon oxide, stannic oxide and lead oxide, metal powders such as powders of gold, silver, copper and aluminum, carbon blacks and/or lead yellow. The species of inorganic pigments incorporated into the coating composition will depend on the desired colors. In some embodiments, the inorganic pigments are titanium oxide, chromic oxide, aluminum oxide and/or carbon blacks.

One embodiment of the invention relates to a method of coating a wire comprising the steps of applying a composition comprising an infrared radiation sensitive compound and a varnish, wherein said infrared radiation sensitive compound has a maximum absorption in the range of 700 nm to 2,000 nm in wavelengths, exposing the coated wire to an irradiation source matching the absorption maximum of the infrared radiation sensitive compound and curing the coating layer.

As a radiation source laser or light emitting diodes (LEDs) may be used as radiation source. The radiation source must match the absorption maximum of the absorber. The absorber component is selected such that it is capable of significant absorption in the range in which the radiation source to be used later on during drying the coating composition. Specifically, the absorber shows an absorption maximum in that range. Thus, if the radiation-sensitive element is e.g. going to be dried by means of an IR laser, the absorber should essentially absorb radiation in the range of about 700 to 2,000 nm and preferably show an absorption maximum in that range.

Laser assisted processing is a well-known technology, in particular in polymer science. For instance, liquid resins can be readily transformed into solid polymer materials by a short exposure to a laser beam. In the present disclosure, a wet coating composition applied to a wire is dried by radiation with infrared rays.

Also high intensity light emitting diodes (LEDs) may be employed. Here too, the LED generated light is absorbed by the absorber in the coating composition driving the drying process of the wet layer.

The thickness of the dry varnish layer of the enamel wire is highly dependent on the later use in industry. The thickness of the varnish layer of an enamel wire is usually in the range of about 10 to 100 μm, specifically in the range of about 30 to 50 μm. In order to obtain the desired thickness of the dry coating, several coating and drying steps may be required.

According to one embodiment of the invention the liquid coating composition is applied as wet layer in a thickness of about 20 μm to 500 μm and then irradiated. In case the desired dry layer thickness is not achieved with a single process run, the coating and drying is repeated until the desired dry layer thickness is achieved. Thus, the process can be conducted as a single step, or up to 10 reruns might be conducted to achieve the desired dry varnish layer thickness.

In case of a flat wire, a first (upper) side of the wire may be irradiated and dried. Thereafter the wire is turned to the other side for drying the wet layer on the other side. In doing so, the other side of the wire is preheated and reheating of the wires can be skipped. In such processes, the photonic drying starts at temperature above the ambient temperature, e.g., of about 50 °C. Nevertheless, continuous processing may be also applied requesting different conditions.

Thus, in some cases it might be advantageous to preheat the wire before irradiation. By preheating the wire, the photonic drying is speed up resulting in a uniform and smooth enamel layer.

According to one embodiment of the invention, the radiation source is fix mounted and the coated wire is passed by, e.g. by a belt. The speed of the belt has a great influence on drying of the wet layer coating composition. The speed employed is decisive on how many photons hit the coated wire leading to absorption and thus to heat generation for the drying process. Following equation is used for calculating the proper belt speed:

$$s=d/t$$

wherein s=velocity [mm/s]

d=distance [mm]

t=time [s].

The speed of the belt may be adjusted accordingly. In some embodiments, the belt speed is in the range of 1 to 5 mm/s, or on the range of 2 to 4 mm/s. In one embodiment, the belt speed is 3.33 mm/s.

One embodiment of the invention relates to an enamel wire, wherein the enamel is cured by irradiation. The specification of the coating material may be adapted to the needs of the end-user, e.g., depending on the technical field of the industry the coating may be specified accordingly. The coating composition may be varied by incorporation of polymethine compounds with different substitution pattern and use of different counter anions.

The enameled wire must fulfill some terms and values. Some companies have defined their own values of the breakdown voltage, which must be fulfilled. For example, the breakdown voltage must always be ≥2 kV and the test voltage increase must not exceed 100 V/s. The breakdown voltage is determined by a standard test method, e.g., ASTM/NEMA MW 1000 test method.

The breakdown voltage depends mainly on the thickness of the insulation, but also on the bare wire diameter, the applied temperature and the type of varnish.

The enameled wire may be used in different technical industrial fields, e.g., in the electronics, automotive, aircraft, and/or adhesive industry. All of the industry branched set different desired specification for the enamel wires used. The current process can easily be adapted in order to fulfill said requirements.

EXAMPLES

The Examples which follow are set forth to aid in the understanding of the invention but are not intended to, and should not be construed to limit the scope of the invention in any way.

Material and Methods

Polymethines (cyanines) are used as NIR absorbers for photonic drying using NIR LEDs or NIR lasers (λ>700 nm).

The absorbers are selected depending on the LEDs and laser used. The LEDs have their extinction maximum at 805 nm and 860 nm respectively. The laser, however, emitted at 980 nm. Nevertheless, other lasers with line-shaped focus may be additionally applicable emitting at a wavelength in the NIR with overlap of the absorption spectrum of the respective absorber.

The absorbers (polymethines) which absorb radiation by either the LEDs or lasers in this wavelength range are listed below. All absorbers are obtained from FEW Chemicals GmbH (Germany).

Analytical Methods for the Characterization of Photonically Coated Wires with LEDs and Lasers DSC-TA Instruments and GS/MS-Varian devices are used to characterize the enameled wires cured by means of NIR light. DSC (Differential Scanning Calorimetry) is used to determine residual solvents or incomplete crosslinking reactions (exothermic effects).

The gas chromatographic analysis with a mass spectrometer (GC-MS) is recorded by means of headspace analysis on a Varian 3900 gas chromatograph with a mass-selective ion trap detector. This analysis is compared with a standard sample as a relative method.

Belt Speed

The speed of the belt plays a major role in drying the coating system. The speed is decisive how many photons hit the system finally leading to absorption of energy by the absorber and thus generating heat.

The speed of the belt is calculated according to the equation as described herein.

| Test Run | Distance [mm] | Time [s] | Voltage [V] | Amperage [A] | Speed [mm/s] |
|---|---|---|---|---|---|
| 1 | 48 | 14.47 | 1.8 | 0.63-0.73 | 3.32 |
| 2 | 69 | 20.71 | 1.8 | 0.63-0.73 | 3.33 |
| 3 | 70 | 20.76 | 1.8 | 0.63-0.73 | 3.37 |
| | | Total: | | | 3.33 |

A belt speed of 3.33 mm/s is used in all tests.

Example 1—S 0991 Laser Treatment

S 0991 (1-butyl-2-(2-[3-[2-(1-butyl-1H-benzo[cd]indol-2-ylidene)-ethylidene]-2-phenyl-cyclohex-1-enyl]-vinyl)-benzo[cd]indolium 4-dodecylbenzenesulfonate) is a polymethine compound with 4-dodecylbenzenesulfonate as counter anion. S 0991 has the following structure:

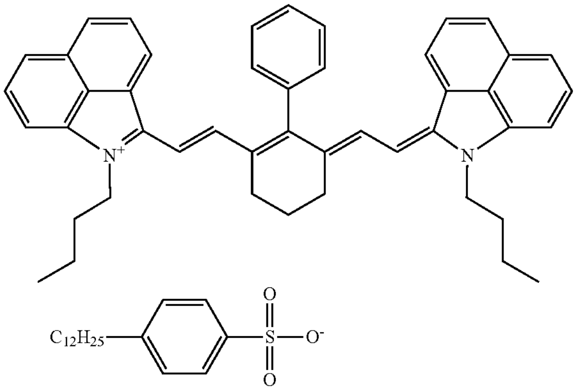

S 0991 has an absorption maximum of 980 nm.

A wire enamel comprising 0.5 wt % S 0991 absorber was produced. 50 mg S 0991 and 10 g lacquer based on a polyvinyl acetal-based insulating varnish were mixed in a SpeedMixer at 2×3,000 rpm. The wire enamel was applied to the flat wire with a wet layer thickness of 30 μm and irradiated with a laser at 980 nm and 300 W. The small wet layer thickness of 30 μm resulted in an acceptable coating layer without any blisters (see FIG. 1).

Full characterization of the samples made by photonic drying applying light to process the materials used Differential Scanning Calorimetry—DSC (TA Instruments Q200) to obtain the requested product parameters. In a crucible, we placed ca. 1-2 mg of sample and subjected it to the heating rate of 10K/min from −20 °C to +300 °C. (first run) or +200 °C. (second run) under a constant $N_2$ flow. As elucidated from the DSC curve in the first run, we observed an endothermic effect in the temperature range from +20 to ca. 110 °C. This can only be caused by moisture because there is no solvent that evaporates in this temperature range. As it can be seen from FIG. 2 in the second run, there is a glass transition (Tg) between 118 and 136 °C while the Tg—value appeared at 127 °C and Δ Cp equals 0.46 (J/g°C.). There is no exothermic effect in the first run of FIGS. 2 and 3. That means that the system completely dried.

Figure 3:
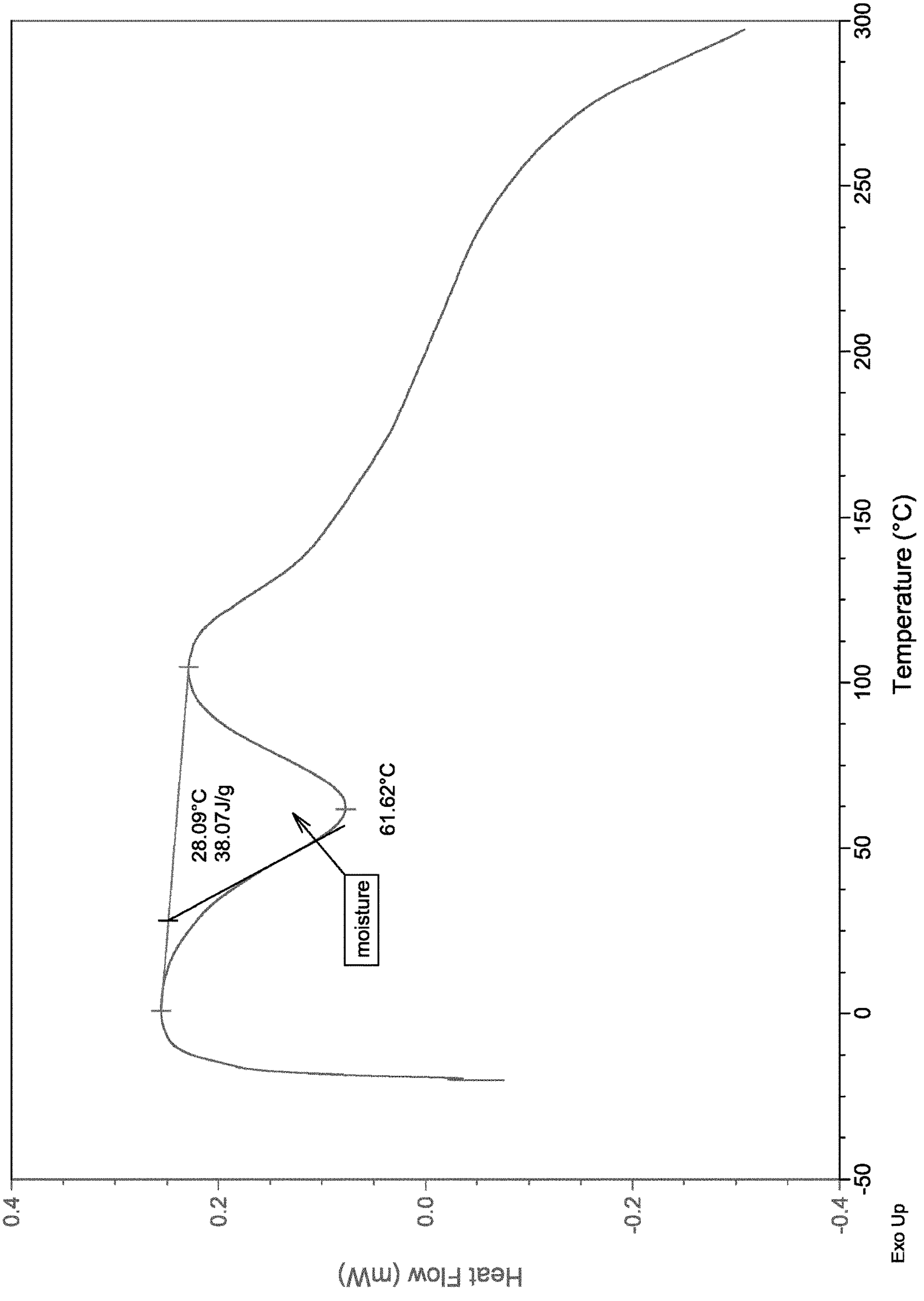
FIG. 3: Curve progression shows that sample obtained by oven drying exhibits data being similar to that of the photonic dried one shown in FIG. 2. The $T_g$-Value appears almost at the same temperature (126 °C) indicating again that there is no significant difference between techniques. The DSC-methodology cannot not clearly determine whether there remain some residual solvents in the processed coating and to what extent they are present. Both samples were analyzed by GC-MS analysis (GS/MS-Varian Varian 3900&MS Saturn 2100T). Approx. 3 mg sample was prepared for each of the investigations. The temperature of the headspace agitator was 199 °C, which corresponds to its maximum. The incubation time was 15 min. The evaluation of the obtained mass spectra was done by comparison with the mass spectra of the references (standard samples).
Figure 3:
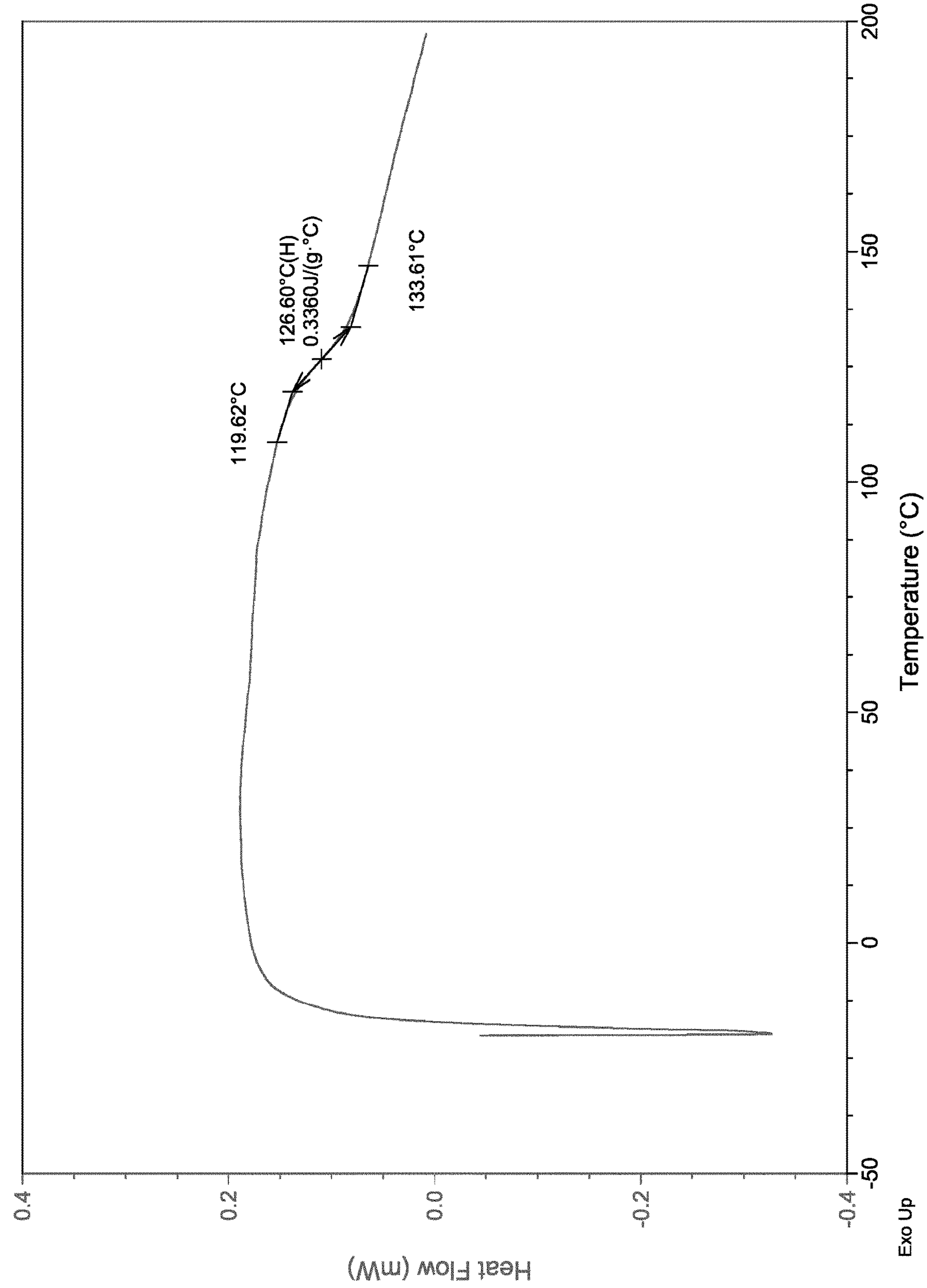

For the evolution of the sample dried with light, we perform the same test with a material dried in the standard enamel oven. As illustrated in FIG. 3, the curve progression of that sample is very similar to that of the photonic dried. The Tg-Value is mostly the same (126 °C.)

As final dry layer thickness of about 30 to 50 μm are required for industrial used enameled wires, the drying process was repeated several times until a final acceptable coating layer without any blisters (see FIG. 1) was achieved.

Example 2—S 2007 Laser Treatment

S 2007 (1-butyl-2-(2-[3-[2-(1-butyl-1H-benzo[cd]indol-2-ylidene)-ethylidene]-2-diphenylamino-cyclopent-1-enyl]-vinyl)-benzo[cd]indolium tetrafluoroborate is a polymethine compound with tetrafluoroborate as counter anion. S 2007 has the following structure:

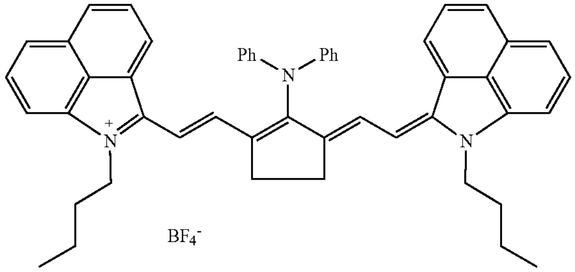

S 2007 has an absorption maximum at about 996 nm.

A wire enamel comprising 0.5 wt % S 2007 absorber was produced. 50 mg S 2007 and 10 g lacquer based on a polyvinyl acetal-based insulating varnish were mixed in a SpeedMixer at 2×3,000 rpm. Here, a coating was applied comprising groups related to blocked isocyanates, which generate reactive groups upon heat treatment. The wire enamel was applied to the flat wire with a wet layer thickness of 30 μm and irradiated with a laser at 980 nm and 300 W. The small wet layer thickness of 30 μm resulted in an acceptable coating layer without any blisters (see FIG. 3). The drying process was repeated several times until the final dry layer thickness was achieved. The resulting final coating layer did not display any blisters.

Example 3—S 2024-1 LED Treatment

S 2024-1 (1-butyl-2-(2-[3-[2-(1-butyl-3,3-dimethyl-1,3-dihydro-indol-2-ylidene)-ethylidene]-2-phenylsulfanyl-cyclohex-1-enyl]-vinyl)-3,3-dimethyl-3H-indolium tetraphenyl borate) is a polymethine compound with tetraphenyl borate as counter anion. S 2024-1 has the following structure:

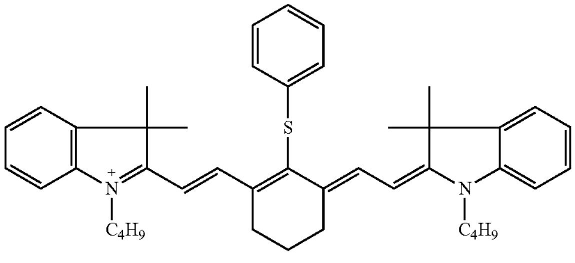

-continued

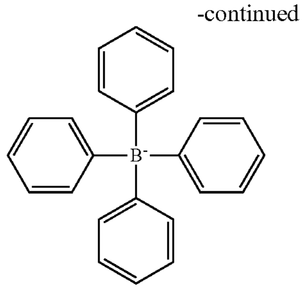

S 2024-1 has an absorption maximum at about 800 nm.

For use in photonic drying a wire enamel is produced comprising 0.5 wt % S 2024-1 absorber. 50 mg S 2024-1 and 10 g lacquer based on a polyvinyl acetal-based insulating varnish are mixed in a SpeedMixer at 2×3000 rpm. The wire enamel is applied to the flat wire with a wet layer thickness of 30 μm and irradiated with a linear focusing light-emitting diode (LED) at 805 nm and 1 $W/cm^2$. The small wet layer thickness of 30 μm results in an acceptable coating layer without any blisters. For achieving a final dry layer thickness of 40 μm the drying process was repeated 6 times.

Example 4—S 2109 LED Treatment

S 2109 (2-[2-[3-[2-(1,3-Dihydro-1,3,3-trimethyl-2H-indol-2-ylidene)-ethylidene]-2-(1-phenyl-1H-tetrazol-5-ylsulfanyl)-1-cyclohexen-1-yl]-ethenyl]-1,3,3-trimethyl-3H-indolium tetraphenyl borate) is a polymethine compound with tetraphenylborate as counter anion. S 2109 has the following structure:

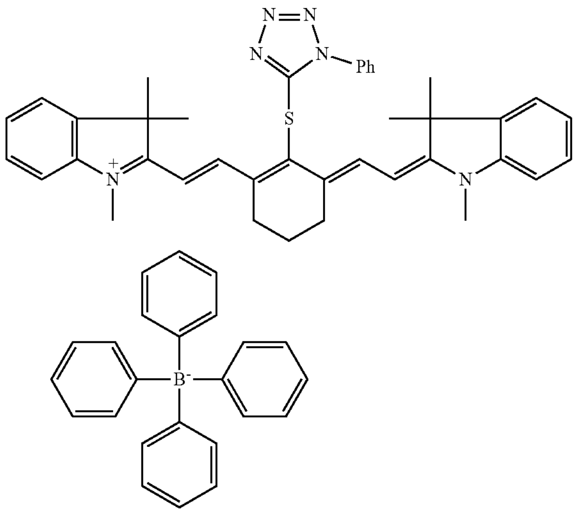

S 2109 has an absorption maximum at about 800 nm.

For use in photonic drying a wire enamel is produced comprising 0.5 wt % S 0507 absorber. 50 mg S 0507 and 10 g lacquer based on a polyvinyl acetal-based insulating varnish are mixed in a SpeedMixer at 2×3,000 rpm. The wire enamel is applied to the flat wire with a wet layer thickness of 30 μm and irradiated with a linear focusing light-emitting diode (LED) at 805 nm and 1 $W/cm^2$). The small wet layer thickness of 30 μm results in an acceptable coating layer without any blisters. For achieving a final dry layer thickness of 40 μm the drying process was repeated 6 times.

Example 5—Comparative Example

All experiments shown in Tables 1 and 2 used the same coating composition comprising components assigned to blocked components resulting in release of reactive components upon treatment with heat. Details were disclosed in WO 2011/015447 A1 and described in Lackformulierung und Lackrezeptur 2005, Issue 2:146-158. The coating composition was coated on a copper substrate exhibiting a size of 300 mm×19.05 mm×3.22 mm. The liquid film was then transferred to the drying experiment.

In a comparative experiment, this coated object was transferred into an oven operated at a temperature of 230 °C applying a processing speed of 20 cm/min and a time of residence of 1.5 min. The dried film obtained was subsequently analyzed regarding the glass transition temperature to approve polymer formation applying DSC measurements (TA Instruments Q200, heating range: −20-300 °C and in and in the second run from −20 to +200 °C, heating rate: 10 K/min, evaluation of exothermal reaction to approve that all monomers were inverted into polymer), and residual amount on solvent by GC-MS (GS/MS-Varian Varian 3900&MS Saturn 2100T:

Capillary column: Innowax, 30 m, 20 M, film thickness 0.5 μm.

Vaporizing injection at 240 °C with split 1:100.

Injection volume: 100 μl

Agitator temperature: 199 °C.

Incubation time: 15 min

Carrier gas: helium.

Since this procedure for thermal coating results in the desired performance, this example serves as comparative example.

Example 6—Photonic Drying

The same coating composition was then used for photonic drying. A NIR absorber (0,25-1.0 wt %) was added that converts the absorbed light energy into heat available to initiate the chemical drying process. Table 1 shows the results obtained applying a laser with line shaped focus emitting either at 980 nm or 808 nm. The length of the beam was beam was 50 cm and the dimension 31 mm×1.8 mm. Experiments were operated with these parameters.

Figure 2:
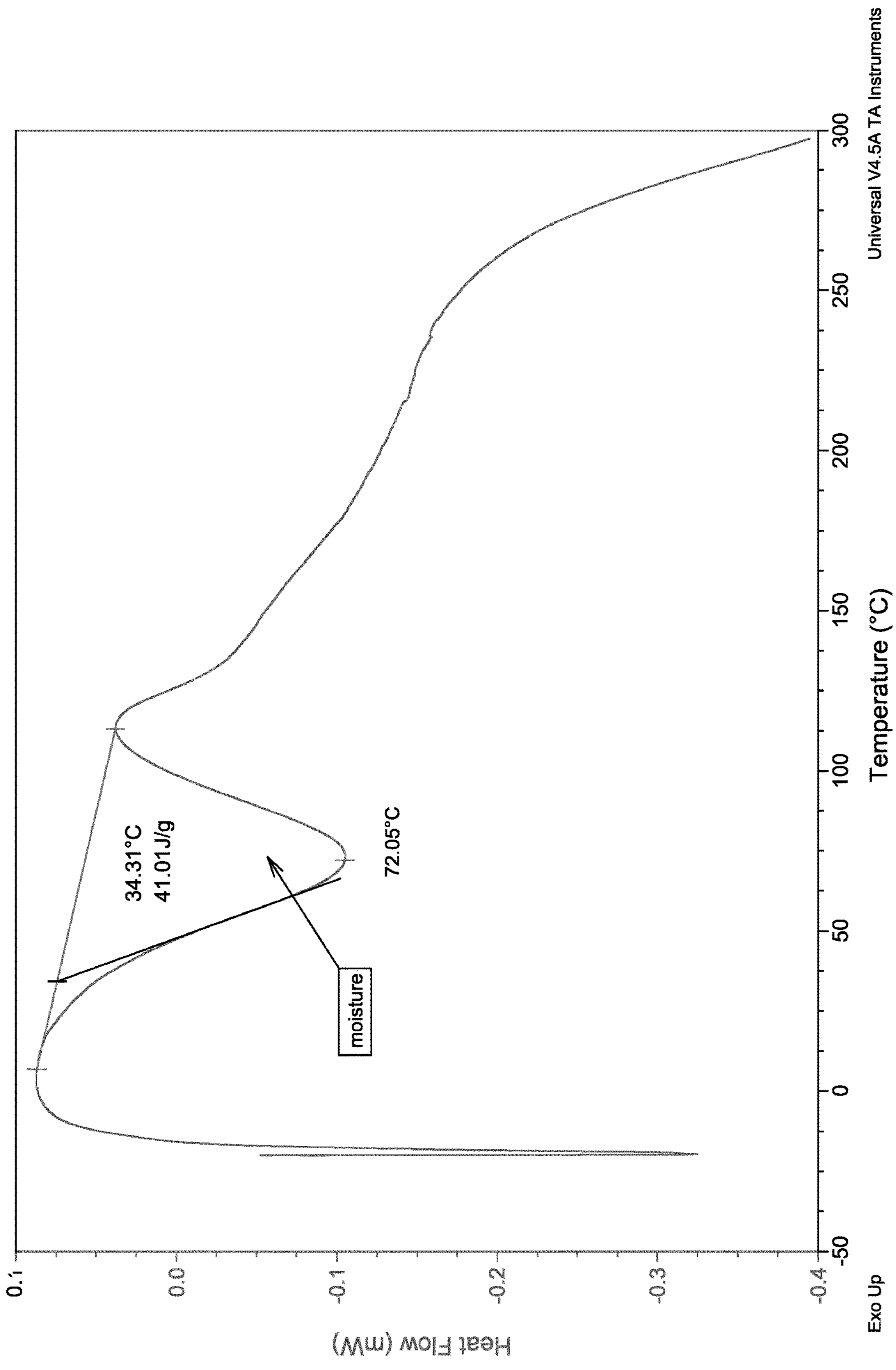
FIG. 2: Photonic drying of the sample showing the first and second run. It exhibited a glass transition ($T_g$) between 118 and 136 °C while the $T_g$-value appeared at 127 °C and Δ Cp equals 0.46 (J/g×K). There is no exothermic effect evidencing that the sample is completely dried with no residual monomer contributing to evocation of reaction heat.

FIGS. 2 and 3 show the DSC curves obtained for the comparative example 1 (Table 1) drying in an enamel oven with three heating zones (400/420/440 °C) and a dwell time of 38 sec. (FIG. 2) and photonic drying (FIG. 3) applying the conditions of experiment 2 in Table 1. There is no significant difference between both samples approving that photonic drying applying a laser with line shaped worked successfully. Samples with incomplete drying typically exhibit exothermal reaction in the heating range and lower glass transition temperatures.

Figure 4:
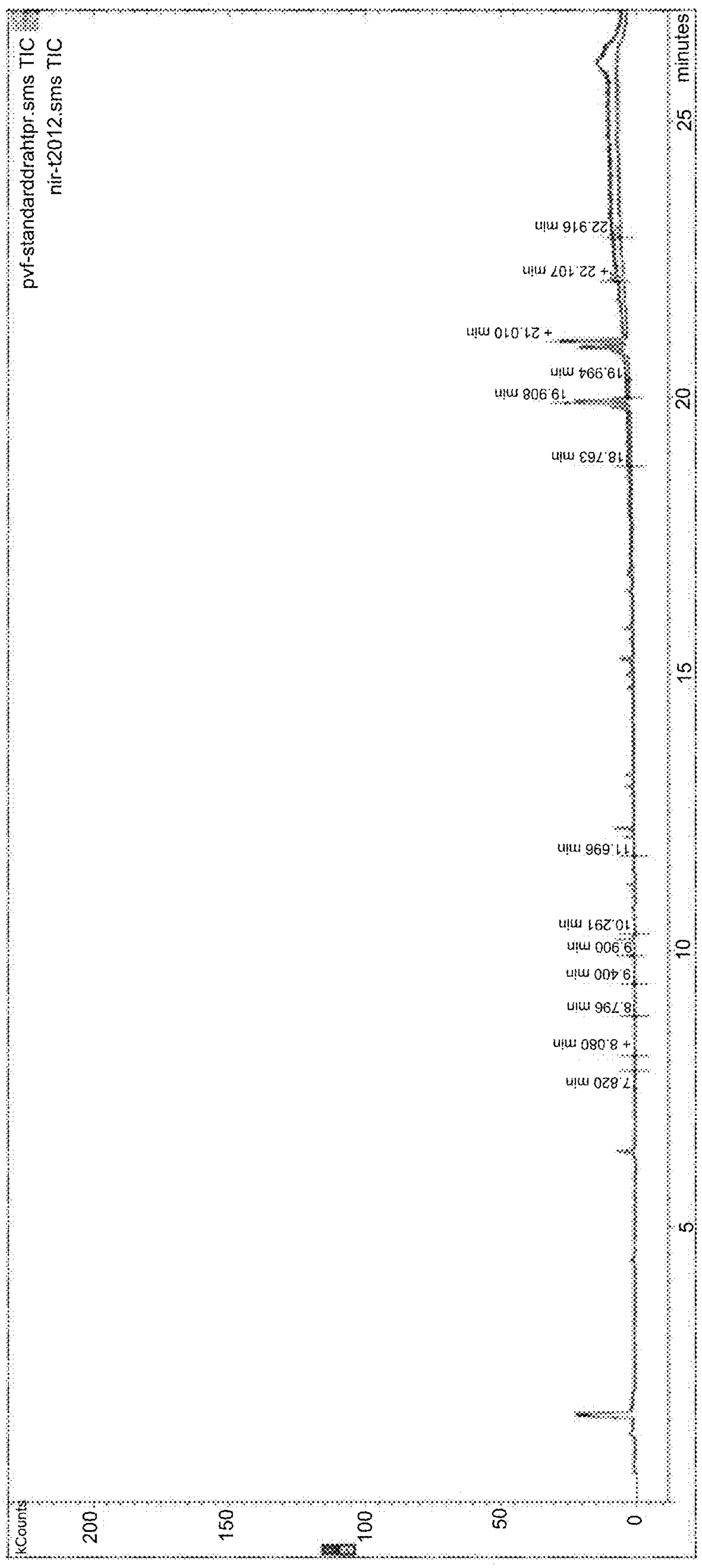
FIG. 4: GC/MS analysis comparison (enamel oven vs. NIR). Both samples are shown; that is the standard as well as the photonic dried sample. There is nearly no residual solvent. The intensity is shown in kilo counts and not in mega counts. Thus, there remains a very small amount of residual solvents applying either conditions of FIG. 2 or 3. Both samples show the same residual solvent component or a very intensity level for the same amount of resist. The detected components possess a retention time between 19 and 21 minutes and relate to cresol and phenol. These components are solvent ingredient of the varnish. This confirms the DSC measurements.
Figure 4:
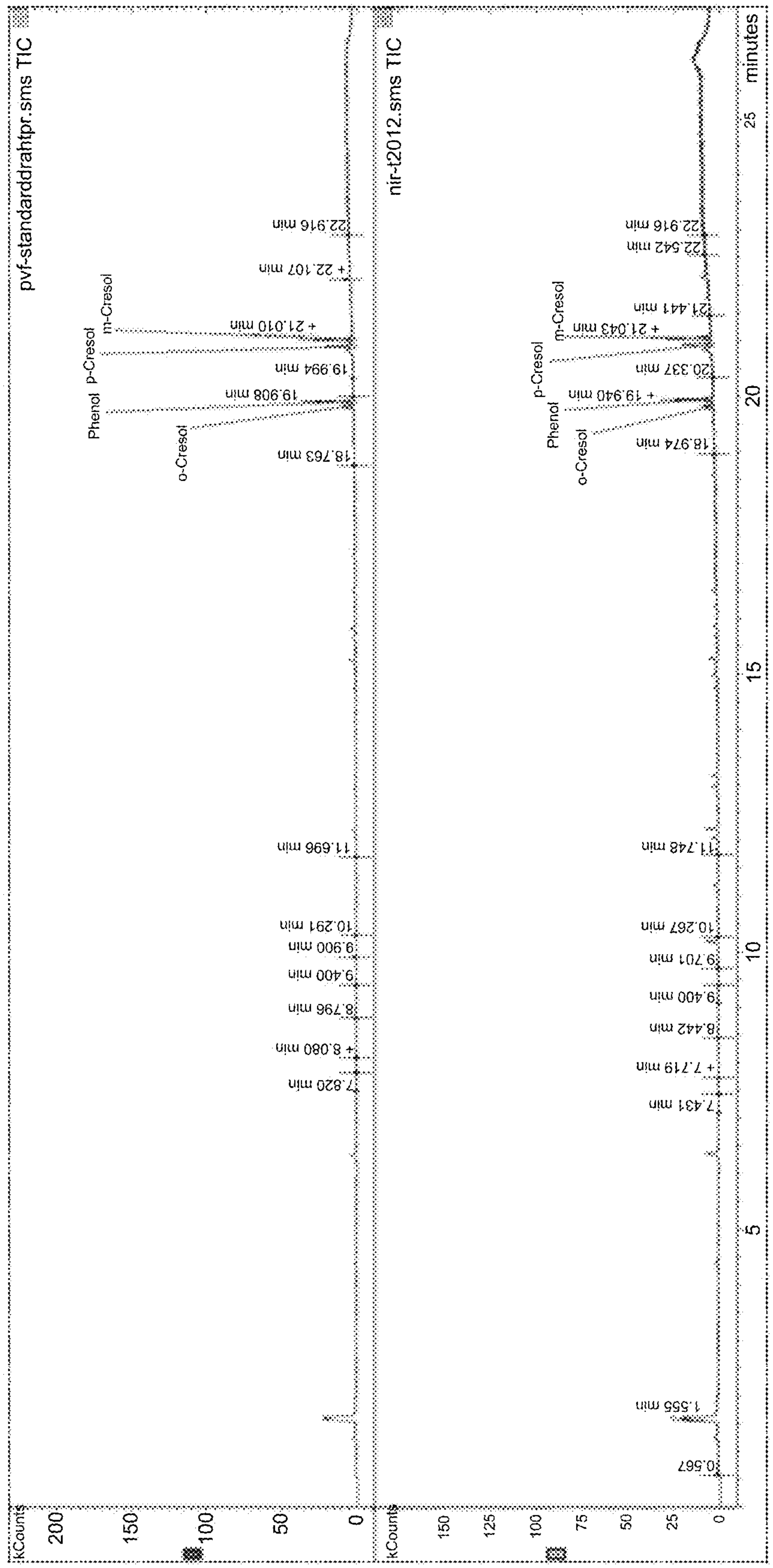

Analysis of the residual amount on volatile components exhibited similar patterns considering both samples dried in the oven and by the laser experiment described vide supra. It evidences again the success of chemical drying based on a photonic technique applying a NIR laser with line shaped focus. FIG. 4 shows the results obtained.

Regarding the evaluation of the film formation, the following gradings were defined. 1 stands for excellent, 2 for good, 3 for acceptable, 4 was given for a coating with some failures, and 5 was inacceptable. Thus, these gradings relate to the following criteria:

1: film was dry, no tackiness, low amount on volatile components, polymer formation was successful, homogenous appearance of the surface, film formation proceeded after short interruption (10 min) of processing possible:

2: film was dry, no tackiness, low amount on volatile components, polymer formation was successful, homogenous appearance of the surface:

3: film was dry, no tackiness, lower amount on volatile components but higher as defined for grading 2, polymer formation was successful but glass transition was lower, homogenous appearance of the surface:

4: film was dry, no tackiness, significant higher amount on volatile components as defined for grading 3, polymer formation was not completed, partially inhomogeneous appearance of the surface.

5: film was not dry.

TABLE 1
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
| --- | --- | --- | --- | --- | --- | --- | --- | --- |
| 1 (comp. example) | — | — | 20 | — | — | — | <0.1 | 2 |
| 2 | 980 | 430 | 20 | 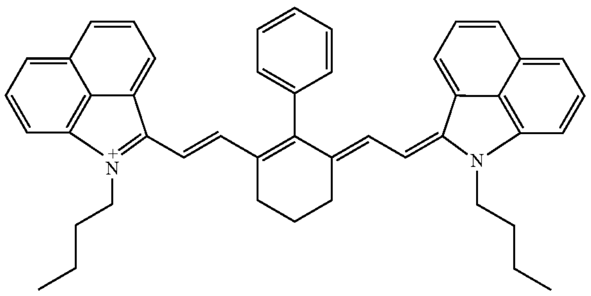 [SMILES: CCCCn1/c(=C/C=C2\CCCC(/C=C/C3=[N+](CCCC)c4cccc5cccc3c45)=C2c2ccccc2)c2cccc3cccc1c32] | 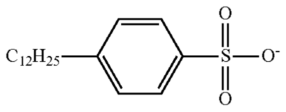 | no | <0.1 | 1 |
| 3 | 980 | 430 | 59 | 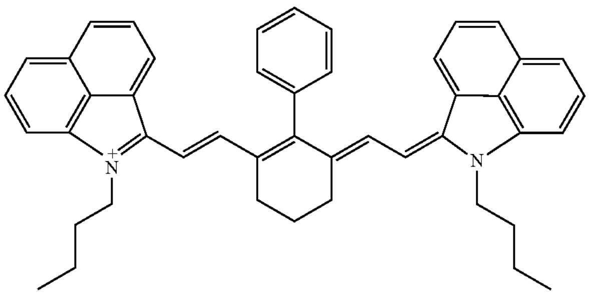 [SMILES: CCCCn1/c(=C/C=C2\CCCC(/C=C/C3=[N+](CCCC)c4cccc5cccc3c45)=C2c2ccccc2)c2cccc3cccc1c32] | 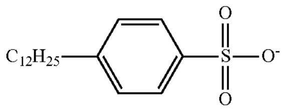 | no | >0.1 | 2 |

TABLE 1-continued
| Laser experiments for drying of wire bar coatings and comparative example pursued by conventional oven technique. | | | | | | | | |
|---|---|---|---|---|---|---|---|---|
| Example | $\lambda_{exc}$ (nm) | Laser power (W) | speed (cm/min) | absorber cation | respective anion | exothermal reaction | Solvent content (wt %) | Grading of film formation according to requirements |
| 4 | 980 | 430 | 200 | 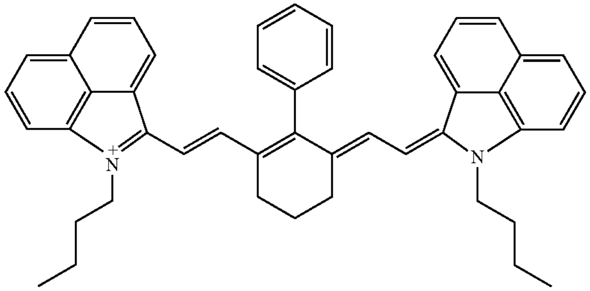 [SMILES: CCCCn1/c(=C/C=C2\CCCC(/C=C/C3=[N+](CCCC)c4cccc5cccc3c45)=C2c2ccccc2)c2cccc3cccc1c32] | 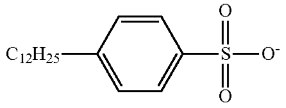 | yes | >0.1 | 3 |
| 5 | 980 | 430 | 500 | 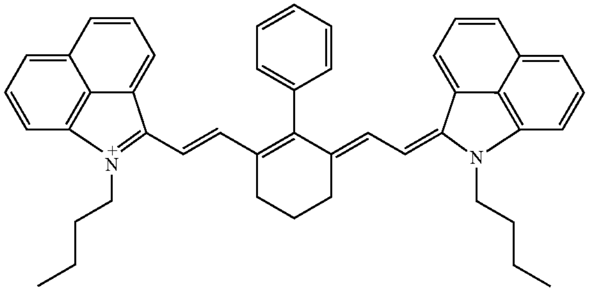 [SMILES: CCCCn1/c(=C/C=C2\CCCC(/C=C/C3=[N+](CCCC)c4cccc5cccc3c45)=C2c2ccccc2)c2cccc3cccc1c32] | 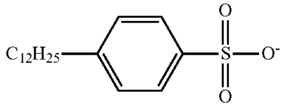 | yes | >>0.1 | 4 |
| 6 | 980 | 430 | 2000 | 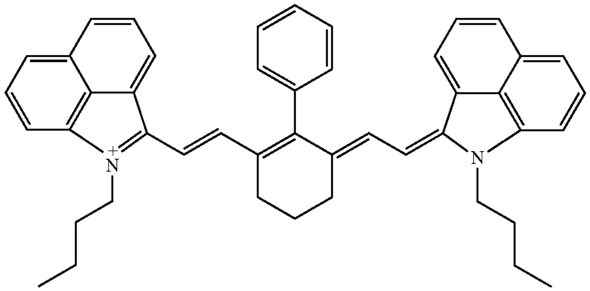 [SMILES: CCCCn1/c(=C/C=C2\CCCC(/C=C/C3=[N+](CCCC)c4cccc5cccc3c45)=C2c2ccccc2)c2cccc3cccc1c32] | 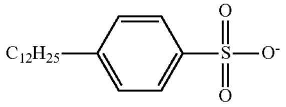 | yes | >>0.1 | 5 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 7 | 980 | 300 | 20 | 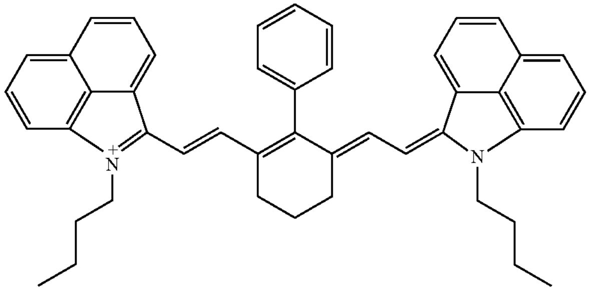 [SMILES: CCCCn1/c(=C/C=C2\CCCC(/C=C/C3=[N+](CCCC)c4cccc5cccc3c45)=C2c2ccccc2)c2cccc3cccc1c32] | 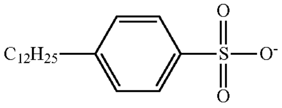 | no | <0.1 | 2 |
| 8 | 980 | 200 | 20 | 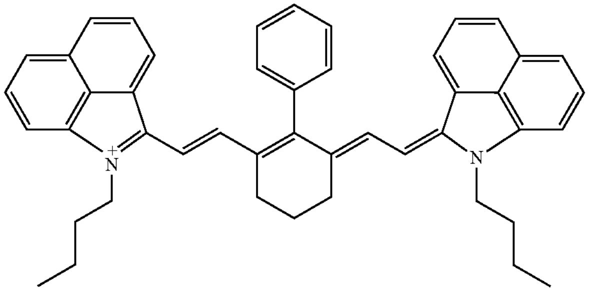 [SMILES: CCCCn1/c(=C/C=C2\CCCC(/C=C/C3=[N+](CCCC)c4cccc5cccc3c45)=C2c2ccccc2)c2cccc3cccc1c32] | 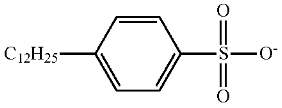 | yes | >0.1 | 3 |
| 9 | 980 | 100 | 20 | 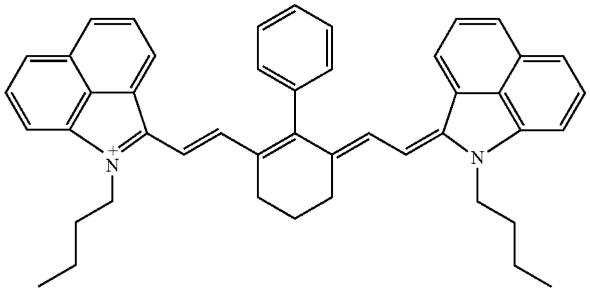 [SMILES: CCCCn1/c(=C/C=C2\CCCC(/C=C/C3=[N+](CCCC)c4cccc5cccc3c45)=C2c2ccccc2)c2cccc3cccc1c32] | 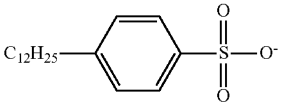 | yes | >>0.1 | 4 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 10 | 980 | 10 | 20 | 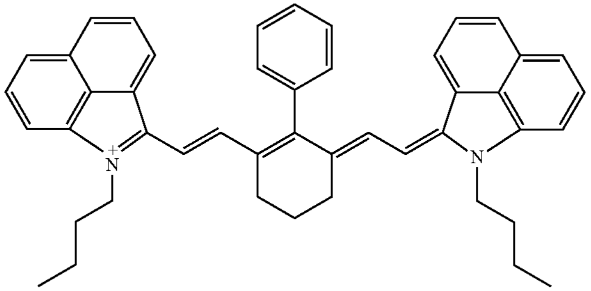 [SMILES: CCCCn1/c(=C/C=C2\CCCC(/C=C/C3=[N+](CCCC)c4cccc5cccc3c45)=C2c2ccccc2)c2cccc3cccc1c32] | 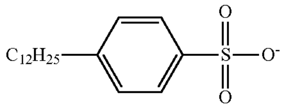 | yes | >>0.1 | 5 |
| 11 | 980 | 300 | 20 | 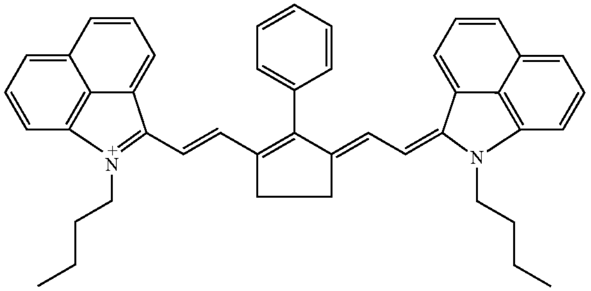 [SMILES: CCCCn1/c(=C/C=C2\CCC(/C=C/C3=[N+](CCCC)c4cccc5cccc3c45)=C2c2ccccc2)c2cccc3cccc1c32] | 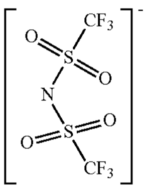 | no | <0.1 | 1 |
| 12 | 980 | 300 | 20 | 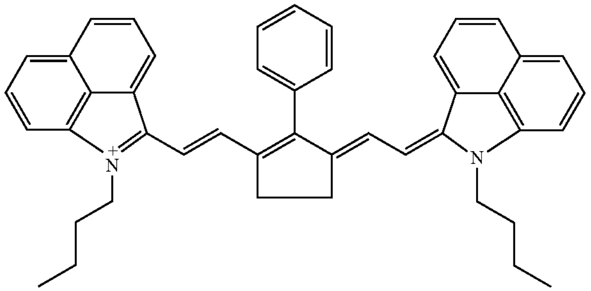 [SMILES: CCCCn1/c(=C/C=C2\CCC(/C=C/C3=[N+](CCCC)c4cccc5cccc3c45)=C2c2ccccc2)c2cccc3cccc1c32] | 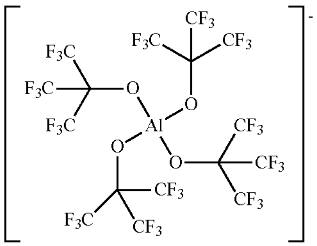 | no | <0.1 | 1 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 13 | 980 | 430 | 59 | 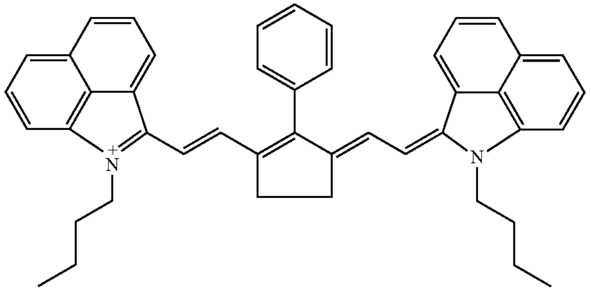 [SMILES: CCCCn1/c(=C/C=C2\CCC(/C=C/C3=[N+](CCCC)c4cccc5cccc3c45)=C2c2ccccc2)c2cccc3cccc1c32] | $BF_4^-$ | no | <0.1 | 2 |
| 14 | 980 | 300 | 59 | 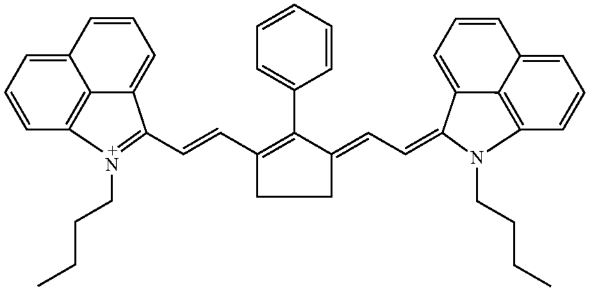 [SMILES: CCCCn1/c(=C/C=C2\CCC(/C=C/C3=[N+](CCCC)c4cccc5cccc3c45)=C2c2ccccc2)c2cccc3cccc1c32] | 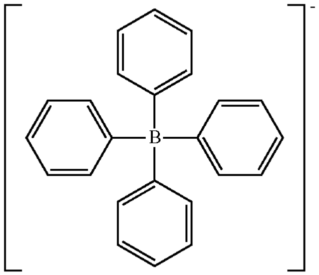 | no | <0.1 | 2 |
| 15 | 980 | 300 | 20 | 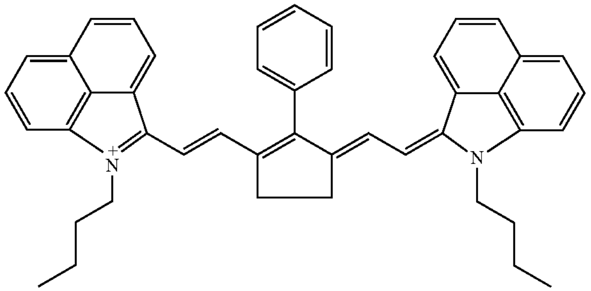 [SMILES: CCCCn1/c(=C/C=C2\CCC(/C=C/C3=[N+](CCCC)c4cccc5cccc3c45)=C2c2ccccc2)c2cccc3cccc1c32] | 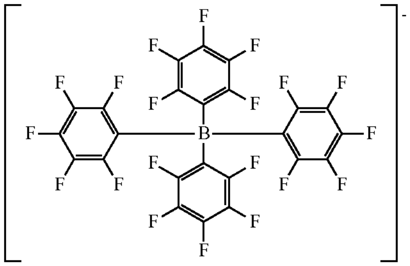 | no | <0.1 | 1 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 16 | 980 | 250 | 20 | 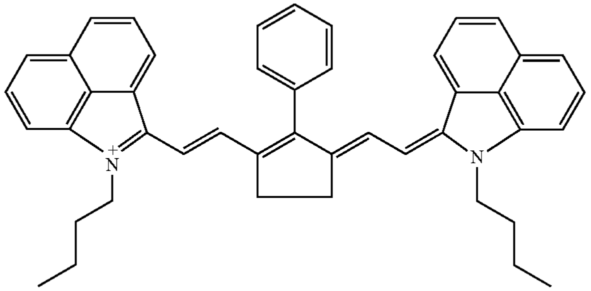 [SMILES: CCCCn1/c(=C/C=C2\CCC(/C=C/C3=[N+](CCCC)c4cccc5cccc3c45)=C2c2ccccc2)c2cccc3cccc1c32] | $Cl^-$ | no | <0.1 | 2 |
| 17 | 980 | 300 | 20 | 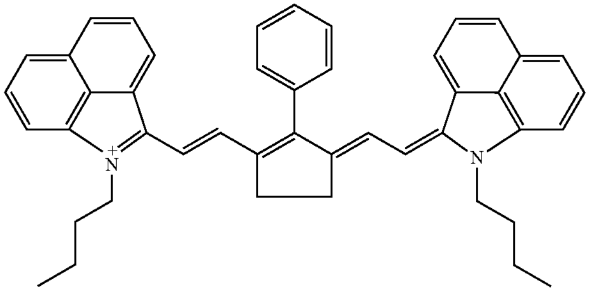 [SMILES: CCCCn1/c(=C/C=C2\CCC(/C=C/C3=[N+](CCCC)c4cccc5cccc3c45)=C2c2ccccc2)c2cccc3cccc1c32] | 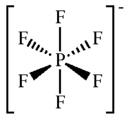 | no | <0.1 | 2 |
| 18 | 980 | 430 | 20 | 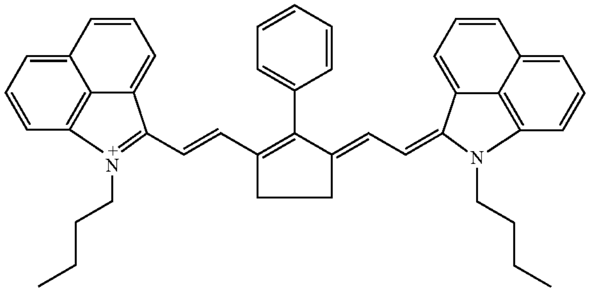 [SMILES: CCCCn1/c(=C/C=C2\CCC(/C=C/C3=[N+](CCCC)c4cccc5cccc3c45)=C2c2ccccc2)c2cccc3cccc1c32] | 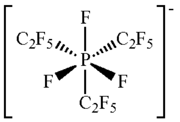 | no | <0.1 | 3 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 19 | 980 | 430 | 59 | 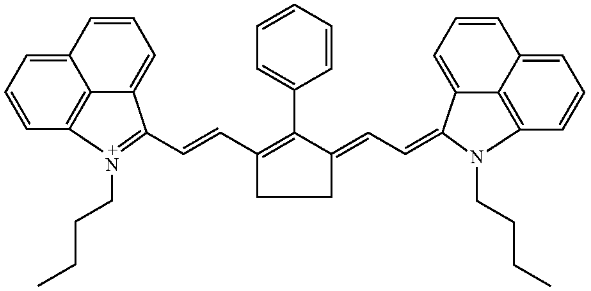 [SMILES: CCCCn1/c(=C/C=C2\CCC(/C=C/C3=[N+](CCCC)c4cccc5cccc3c45)=C2c2ccccc2)c2cccc3cccc1c32] | 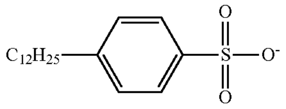 | yes | <0.1 | 1 |
| 20 | 980 | 300 | 200 | 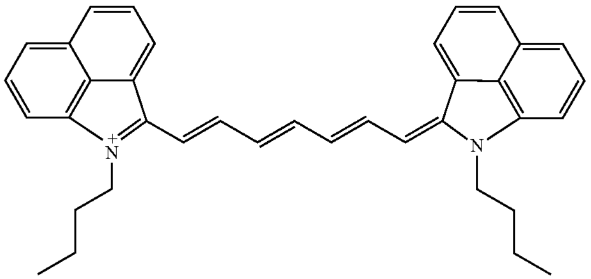 [SMILES: CCCCn1/c(=C/C=C/C=C/C=C/C2=[N+](CCCC)c3cccc4cccc2c34)c2cccc3cccc1c32] | 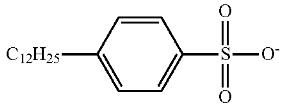 | no | <0.1 | 1 |
| 21 | 808 | 430 | 20 | 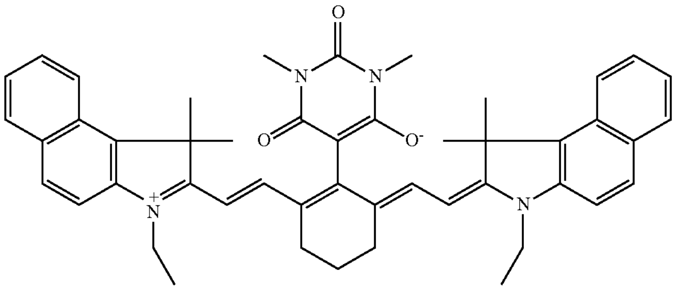 [SMILES: CCN1/C(=C/C=C2\CCCC(/C=C/C3=[N+](CC)c4ccc5ccccc5c4C3(C)C)=C2c2c([O-])n(C)c(=O)n(C)c2=O)C(C)(C)c2c1ccc1ccccc21] | 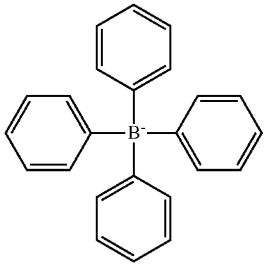 [SMILES: c1ccc([B-](c2ccccc2)(c2ccccc2)c2ccccc2)cc1] | yes | >0.1 | 3 |

TABLE 1-continued
Laser experiments for drying of wire bar coatings and comparative example pursued by conventional oven technique.
| Ex-ample | $\lambda_{exc}$ (nm) | Laser power (W) | speed (cm/min) | absorber cation | respective anion | exo-thermal reaction | Solvent content (wt %) | Grading of film formation according to requirements |
|---|---|---|---|---|---|---|---|---|
| 22 | 808 | 430 | 20 | 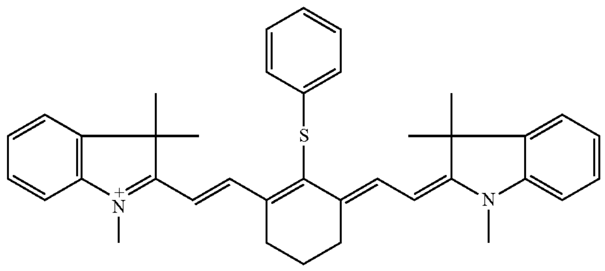 [SMILES: CN1/C(=C/C=C2\CCCC(/C=C/C3=[N+](C)c4ccccc4C3(C)C)=C2Sc2ccccc2)C(C)(C)c2ccccc21] | 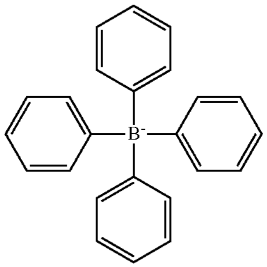 [SMILES: c1ccc([B-](c2ccccc2)(c2ccccc2)c2ccccc2)cc1] | yes | >0.1 | 3 |
| 23 | 808 | 430 | 20 | 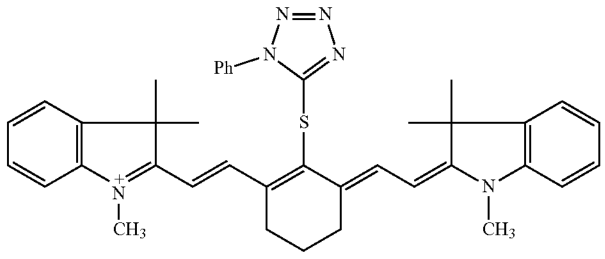 [SMILES: CN1/C(=C/C=C2\CCCC(/C=C/C3=[N+](C)c4ccccc4C3(C)C)=C2Sc2nnnn2-c2ccccc2)C(C)(C)c2ccccc21] | 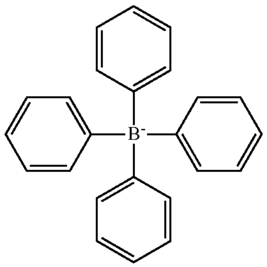 [SMILES: c1ccc([B-](c2ccccc2)(c2ccccc2)c2ccccc2)cc1] | yes | >0.1 | 3 |
| 24 | 808 | 430 | 20 | 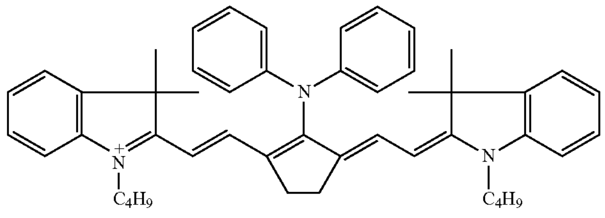 | 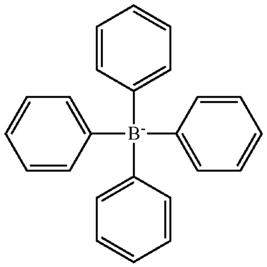 [SMILES: c1ccc([B-](c2ccccc2)(c2ccccc2)c2ccccc2)cc1] | yes | >0.1 | 3 |

TABLE 1-continued
Laser experiments for drying of wire bar coatings and comparative example pursued by conventional oven technique.
| Ex-ample | $\lambda_{exc}$ (nm) | Laser power (W) | speed (cm/min) | absorber cation | respective anion | exo-thermal reaction | Solvent content (wt %) | Grading of film formation according to requirements |
|---|---|---|---|---|---|---|---|---|
| 25 | 808 | 430 | 20 | 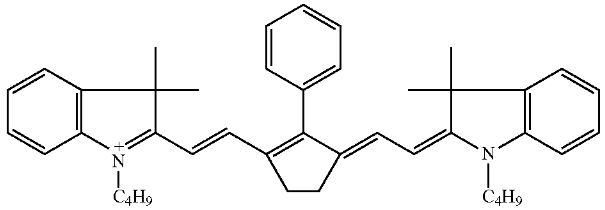 | 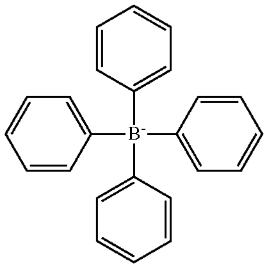 [SMILES: c1ccc([B-](c2ccccc2)(c2ccccc2)c2ccccc2)cc1] | yes | >0.1 | 3 |
| 26 | 808 | 430 | 20 | 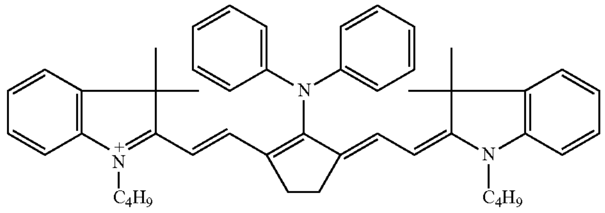 | 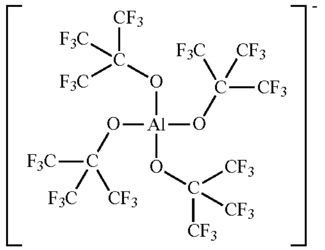 | yes | >0.1 | 3 |
| 27 | 808 | 430 | 20 | 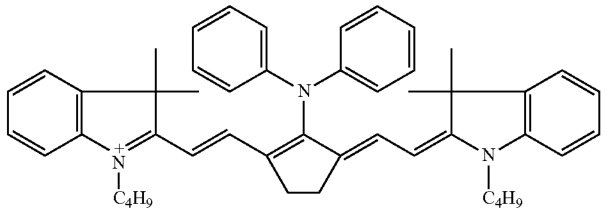 | 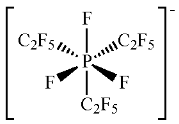 | yes | >0.1 | 3 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 28 | 808 | 430 | 20 | 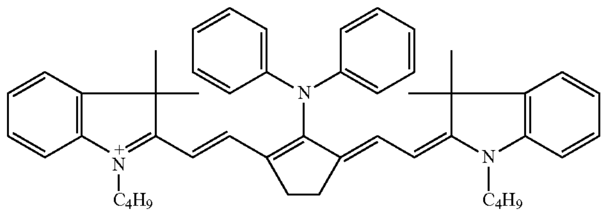 | 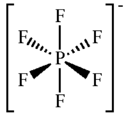 | yes | >0.1 | 3 |
| 29 | 808 | 430 | 20 | 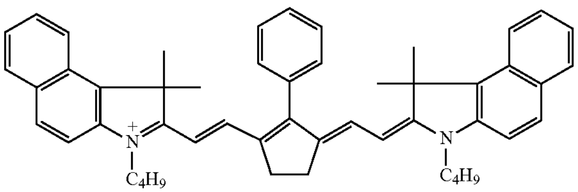 | 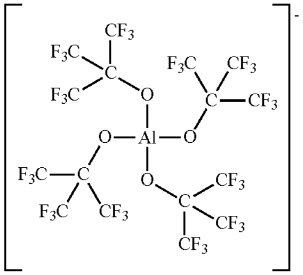 | yes | >0.1 | 3 |
| 30 | 808 | 430 | 20 | 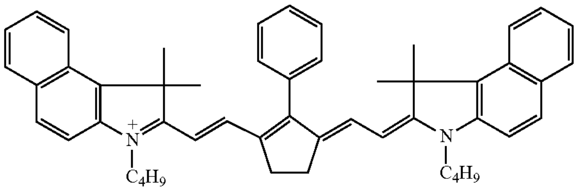 | 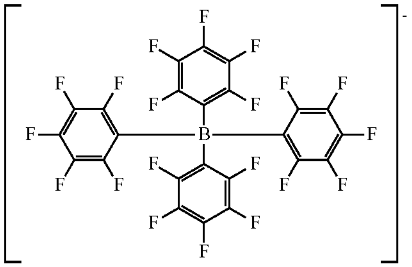 | yes | >0.1 | 3 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 31 | 808 | 430 | 20 | 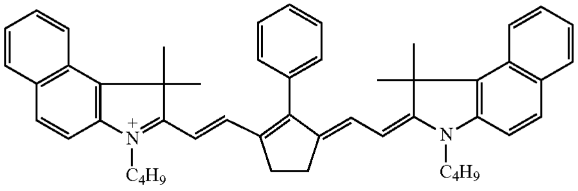 | 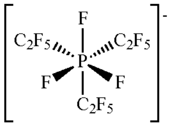 | yes | >0.1 | 3 |
| 32 | 808 | 430 | 20 | 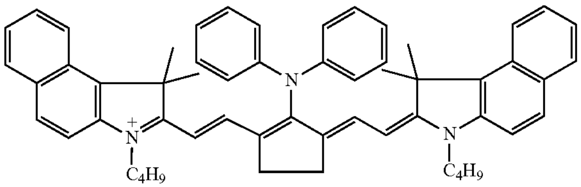 | 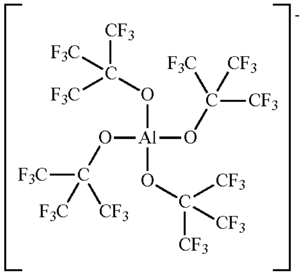 | yes | >0.1 | 3 |

TABLE 1-continued
Laser experiments for drying of wire bar coatings and comparative example pursued by conventional oven technique.
| Example | $\lambda_{exc}$ (nm) | Laser power (W) | speed (cm/min) | absorber cation | respective anion | exothermal reaction | Solvent content (wt %) | Grading of film formation according to requirements |
|---|---|---|---|---|---|---|---|---|
| 33 | 808 | 430 | 20 | 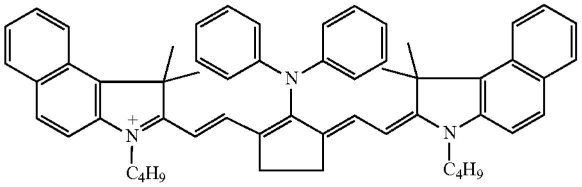 | 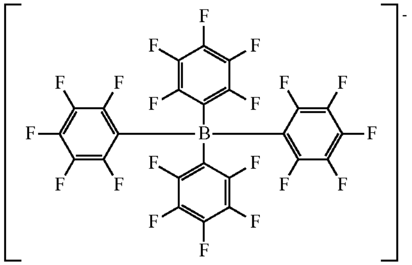 | yes | >0.1 | 3 |
| 34 | 808 | 430 | 20 | 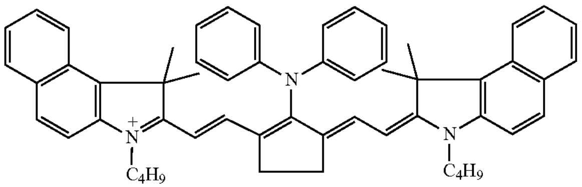 | 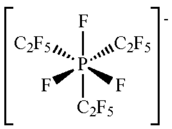 | yes | >0.1 | 3 |

Example 7—Use of High-Power LED Devices

As an alternative, new high-power LED devices were applied for photonic drying. They present a new development in this field as shown Schmitz C. et al., Angew. Chem., Int. Ed. 2019, 58, (13) 4400-4404 and Pang Y., et al., Angew. Chem. Int. Ed. 2020, 59(28), 11440-11447 exhibiting an emission at 808 nm and 860 nm, respectively. Their power density released exhibited values of 8 W/cm$^2$ enabling systems to work, which failed applying week emitting LEDs (Schmitz C., et al., Progress in Organic Coatings 2016, 100, 32-46). An additional high-power NIR-LED was included in the experiments emitting at 940 nm. Formation of a solid film with respective polymer formation can be seen as a big progress in this field. Application of much stronger emitting LEDs is going to result in shorter processing times. Results are shown in Table 2.

Figure 5:
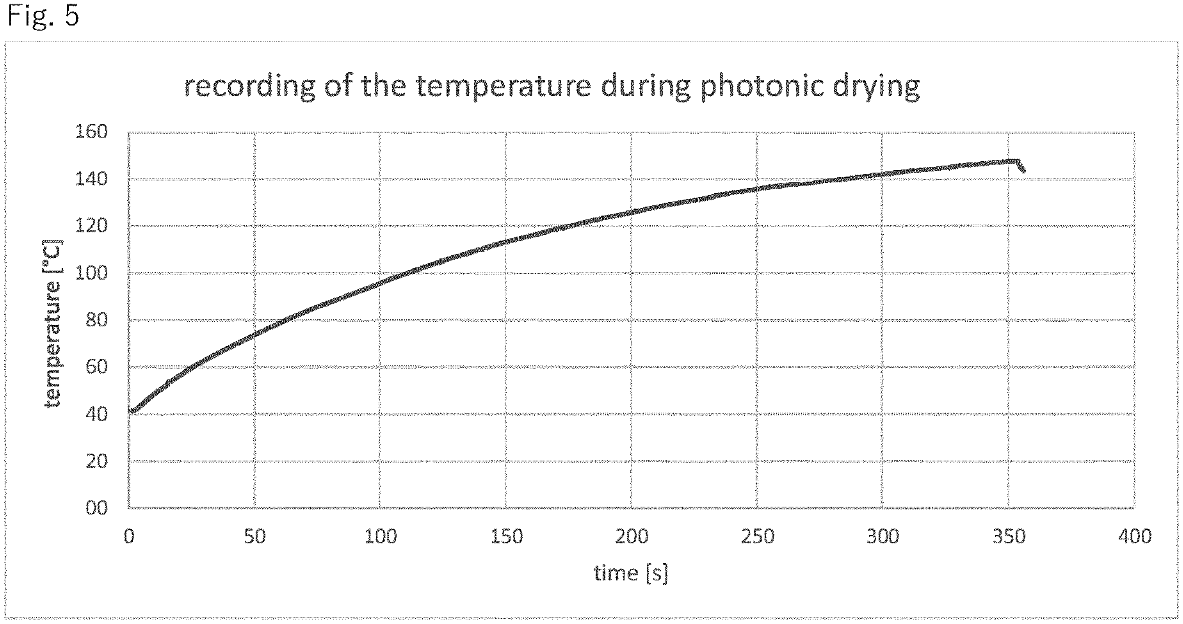
FIG. 5: Recording of the temperature generated in the sample shown in FIG. 1 (sample: T4-VI) using a thermal sensitive camera (Testo 885).

A thermal sensitive camera (testo 885—thermal camera) monitored the success of drying since the absorber released sufficient heat (see FIG. 5).

TABLE 2

High-Power LED experiments for drying of wire bar coatings applying a LED intensity of 8 W/cm$^2$

| Example | $\lambda_{exc}$ (nm) | Time of residence (min) | absorber cation | respective anion | film formation |
|---|---|---|---|---|---|
| 34 | 940 | 3 | 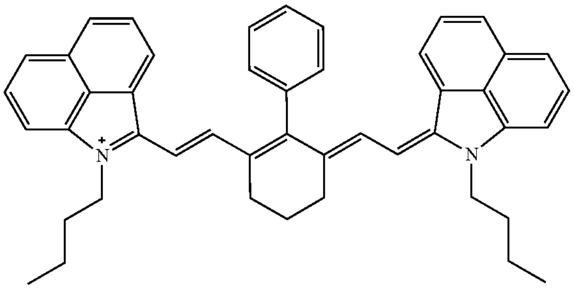 [SMILES: CCCCn1/c(=C/C=C2\CCCC(/C=C/C3=[N+](CCCC)c4cccc5cccc3c45)=C2c2ccccc2)c2cccc3cccc1c32] | 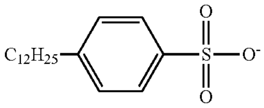 | yes |
| 35 | 940 | 3 | 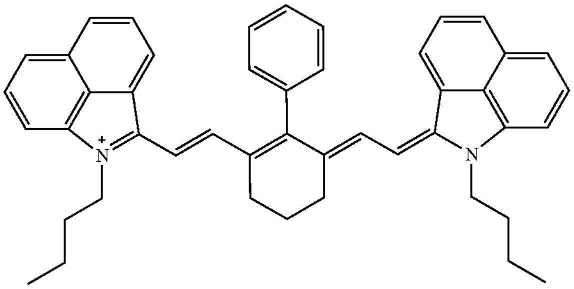 [SMILES: CCCCn1/c(=C/C=C2\CCCC(/C=C/C3=[N+](CCCC)c4cccc5cccc3c45)=C2c2ccccc2)c2cccc3cccc1c32] | 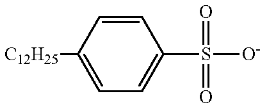 | yes |
| 36 | 940 | 0.1 | 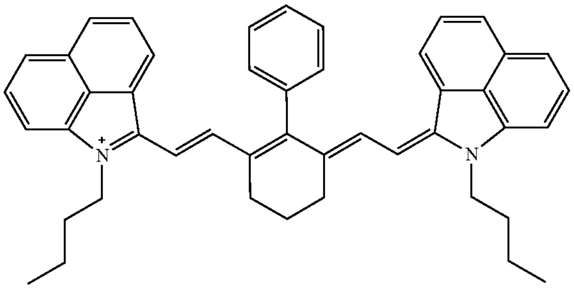 [SMILES: CCCCn1/c(=C/C=C2\CCCC(/C=C/C3=[N+](CCCC)c4cccc5cccc3c45)=C2c2ccccc2)c2cccc3cccc1c32] | 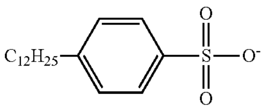 | no |
| 37 | 940 | 3 | 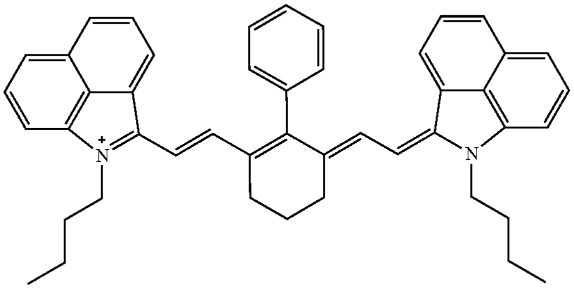 [SMILES: CCCCn1/c(=C/C=C2\CCCC(/C=C/C3=[N+](CCCC)c4cccc5cccc3c45)=C2c2ccccc2)c2cccc3cccc1c32] | 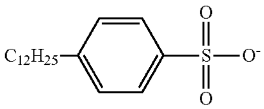 | no |

TABLE 2-continued
High-Power LED experiments for drying of wire bar coatings applying a LED intensity of 8 W/cm$^2$
| Example | $\lambda_{exc}$ (nm) | Time of residence (min) | absorber cation | respective anion | film formation |
|---|---|---|---|---|---|
| 38 | 940 | 3 | 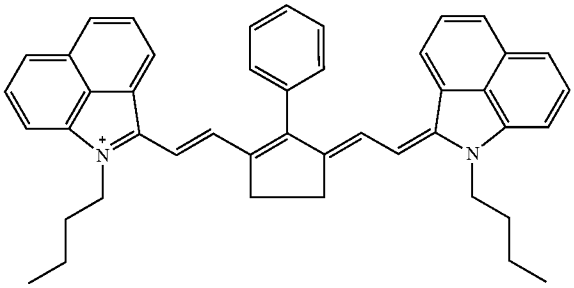 [SMILES: CCCCn1/c(=C/C=C2\CCC(/C=C/C3=[N+](CCCC)c4cccc5cccc3c45)=C2c2ccccc2)c2cccc3cccc1c32] | 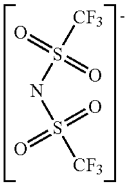 | yes |
| 39 | 940 | 3 | 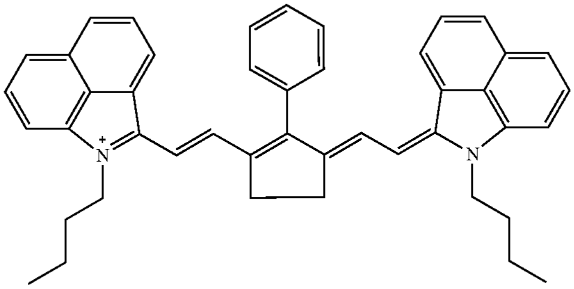 [SMILES: CCCCn1/c(=C/C=C2\CCC(/C=C/C3=[N+](CCCC)c4cccc5cccc3c45)=C2c2ccccc2)c2cccc3cccc1c32] | 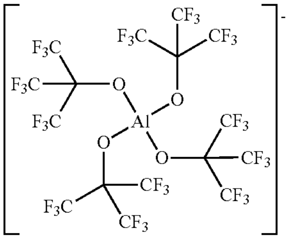 | yes |
| 40 | 940 | 3 | 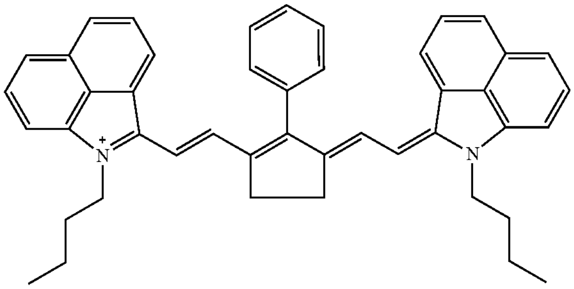 [SMILES: CCCCn1/c(=C/C=C2\CCC(/C=C/C3=[N+](CCCC)c4cccc5cccc3c45)=C2c2ccccc2)c2cccc3cccc1c32] | $BF_4^-$ | yes |
| 41 | 940 | 3 | 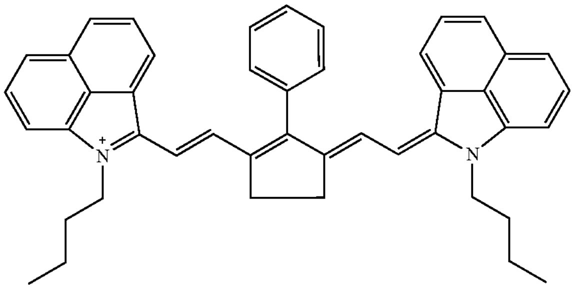 [SMILES: CCCCn1/c(=C/C=C2\CCC(/C=C/C3=[N+](CCCC)c4cccc5cccc3c45)=C2c2ccccc2)c2cccc3cccc1c32] | 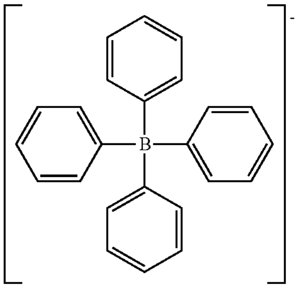 | yes |
| 42 | 940 | 3 | 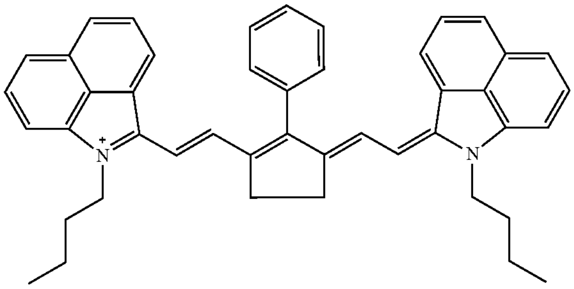 [SMILES: CCCCn1/c(=C/C=C2\CCC(/C=C/C3=[N+](CCCC)c4cccc5cccc3c45)=C2c2ccccc2)c2cccc3cccc1c32] | 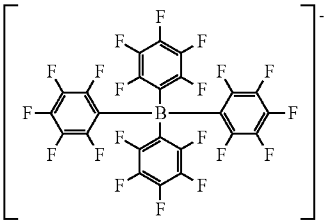 | yes |

TABLE 2-continued
High-Power LED experiments for drying of wire bar coatings applying a LED intensity of 8 W/$cm^2$
| Example | $\lambda_{exc}$ (nm) | Time of residence (min) | absorber cation | respective anion | film formation |
|---|---|---|---|---|---|
| 43 | 940 | 3 | 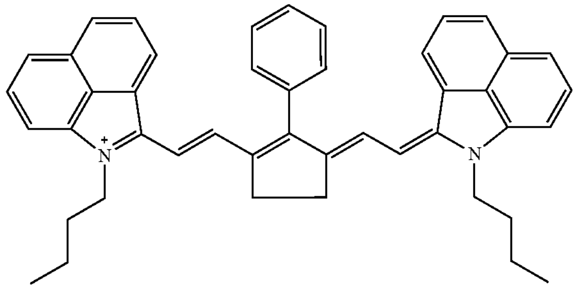 [SMILES: CCCCn1/c(=C/C=C2\CCC(/C=C/C3=[N+](CCCC)c4cccc5cccc3c45)=C2c2ccccc2)c2cccc3cccc1c32] | $Cl^-$ | yes |
| 44 | 940 | 3 | 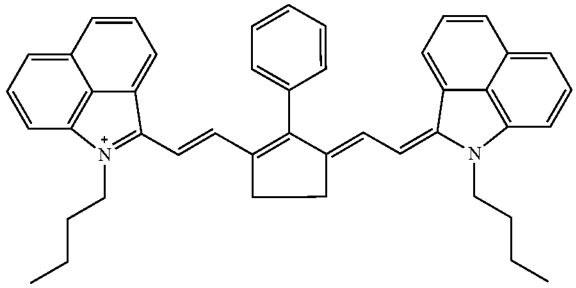 [SMILES: CCCCn1/c(=C/C=C2\CCC(/C=C/C3=[N+](CCCC)c4cccc5cccc3c45)=C2c2ccccc2)c2cccc3cccc1c32] | 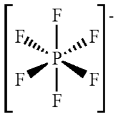 | yes |
| 45 | 940 | 3 | 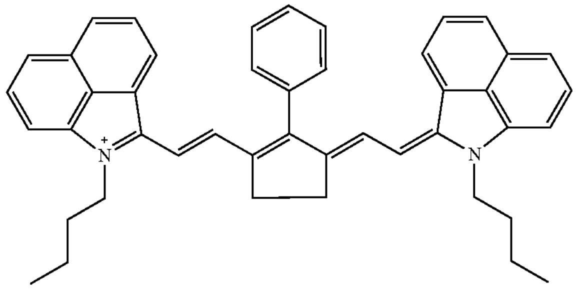 [SMILES: CCCCn1/c(=C/C=C2\CCC(/C=C/C3=[N+](CCCC)c4cccc5cccc3c45)=C2c2ccccc2)c2cccc3cccc1c32] | 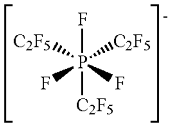 | yes |
| 46 | 940 | 3 | 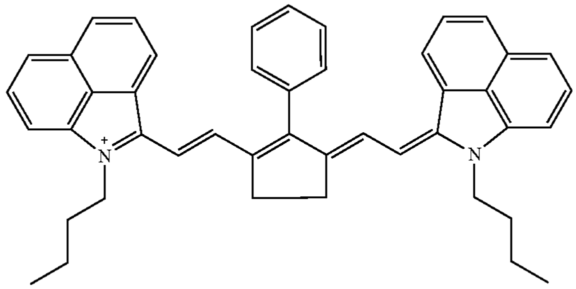 [SMILES: CCCCn1/c(=C/C=C2\CCC(/C=C/C3=[N+](CCCC)c4cccc5cccc3c45)=C2c2ccccc2)c2cccc3cccc1c32] | 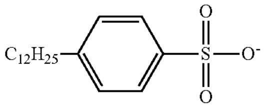 | yes |
| 47 | 940 | 3 | 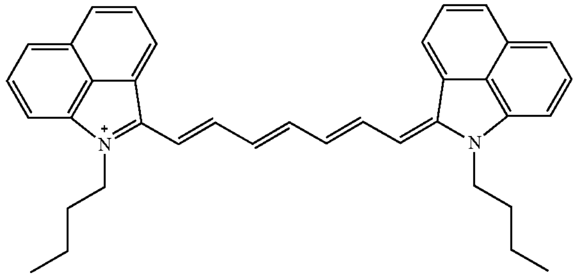 [SMILES: CCCCn1/c(=C/C=C/C=C/C=C/C2=[N+](CCCC)c3cccc4cccc2c34)c2cccc3cccc1c32] | 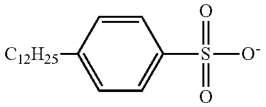 | yes |

TABLE 2-continued
High-Power LED experiments for drying of wire bar coatings applying a LED intensity of 8 W/$cm^2$
| Example | $\lambda_{exc}$ (nm) | Time of residence (min) | absorber cation | respective anion | film formation |
|---|---|---|---|---|---|
| 48 | 860 | 3 | 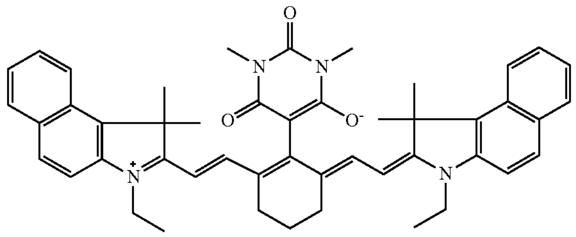 [SMILES: CCN1/C(=C/C=C2\CCCC(/C=C/C3=[N+](CC)c4ccc5ccccc5c4C3(C)C)=C2c2c([O-])n(C)c(=O)n(C)c2=O)C(C)(C)c2c1ccc1ccccc21] | | yes |
| 49 | 808 | 3 | 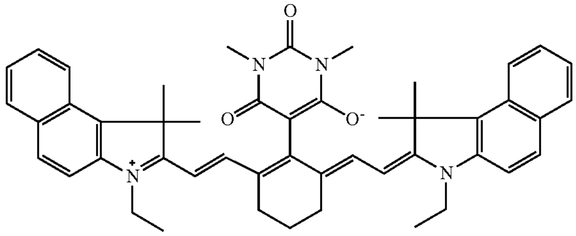 [SMILES: CCN1/C(=C/C=C2\CCCC(/C=C/C3=[N+](CC)c4ccc5ccccc5c4C3(C)C)=C2c2c([O-])n(C)c(=O)n(C)c2=O)C(C)(C)c2c1ccc1ccccc21] | | yes |
| 46 | 808 | 3 | 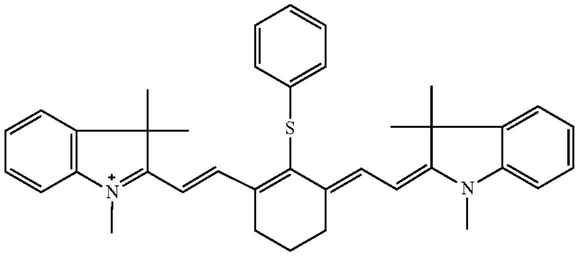 [SMILES: CN1/C(=C/C=C2\CCCC(/C=C/C3=[N+](C)c4ccccc4C3(C)C)=C2Sc2ccccc2)C(C)(C)c2ccccc21] | 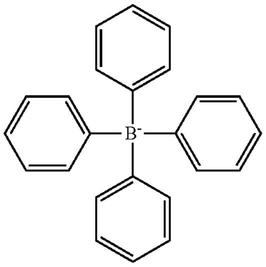 [SMILES: c1ccc([B-](c2ccccc2)(c2ccccc2)c2ccccc2)cc1] | yes |
| 50 | 808 | 3 | 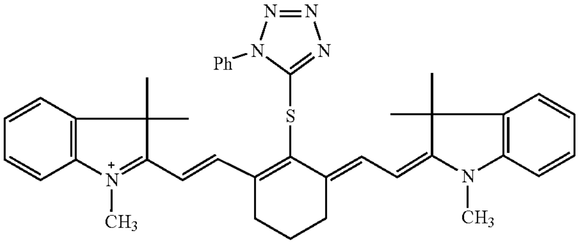 [SMILES: CN1/C(=C/C=C2\CCCC(/C=C/C3=[N+](C)c4ccccc4C3(C)C)=C2Sc2nnnn2-c2ccccc2)C(C)(C)c2ccccc21] | 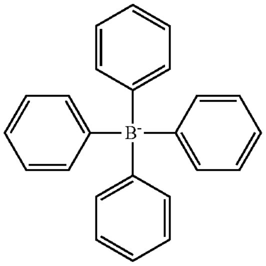 [SMILES: c1ccc([B-](c2ccccc2)(c2ccccc2)c2ccccc2)cc1] | yes |
| 48 | 808 | 3 | 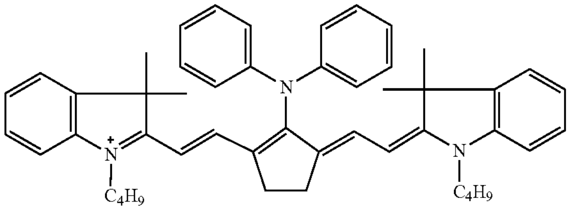 | 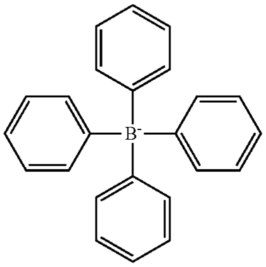 [SMILES: c1ccc([B-](c2ccccc2)(c2ccccc2)c2ccccc2)cc1] | yes |

TABLE 2-continued
High-Power LED experiments for drying of wire bar coatings applying a LED intensity of 8 W/$cm^2$
| Example | $\lambda_{exc}$ (nm) | Time of residence (min) | absorber cation | respective anion | film formation |
|---|---|---|---|---|---|
| 51 | 808 | 3 | 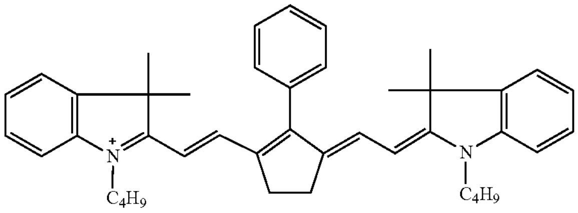 | 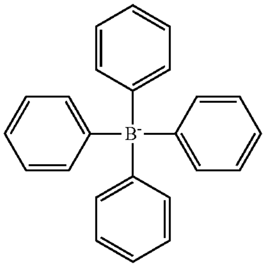 [SMILES: c1ccc([B-](c2ccccc2)(c2ccccc2)c2ccccc2)cc1] | yes |
| 52 | 808 | 3 | 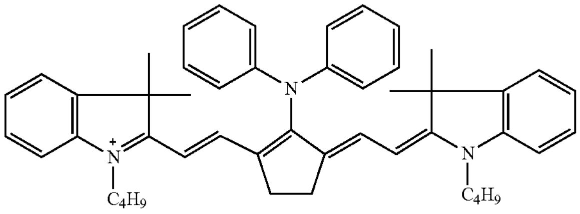 | 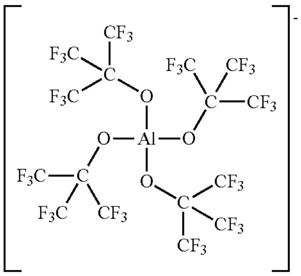 | yes |
| 53 | 808 | 3 | 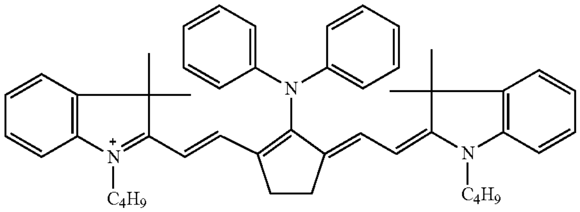 | 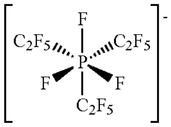 | yes |
| 54 | 808 | 3 | 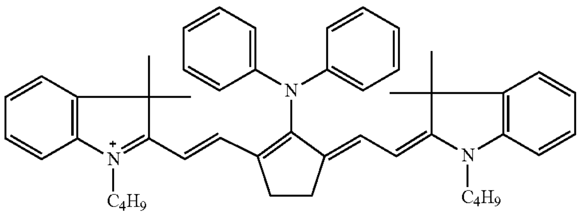 | 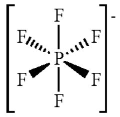 | yes |
| 55 | 860 | 3 | 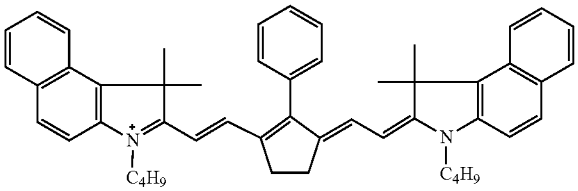 | 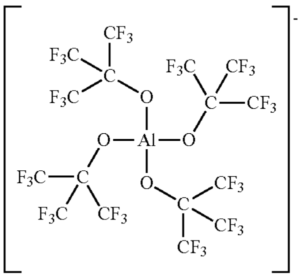 | yes |

TABLE 2-continued
High-Power LED experiments for drying of wire bar coatings applying a LED intensity of 8 W/cm$^2$
| Example | $\lambda_{exc}$ (nm) | Time of residence (min) | absorber cation | respective anion | film formation |
|---|---|---|---|---|---|
| 56 | 860 | 3 | 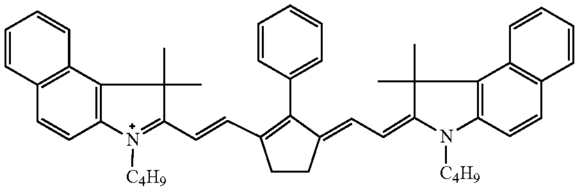 | 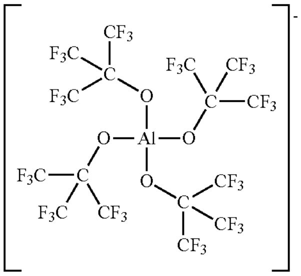 | yes |
| 57 | 860 | 3 | 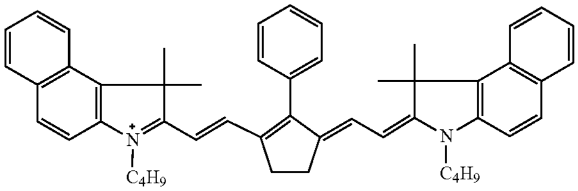 | 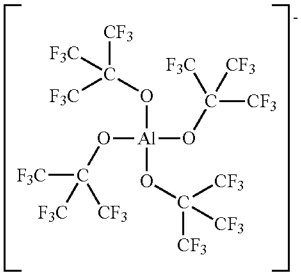 | yes |
| 58 | 860 | 3 | 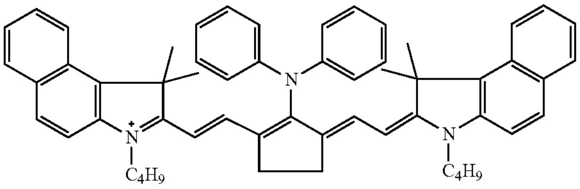 | 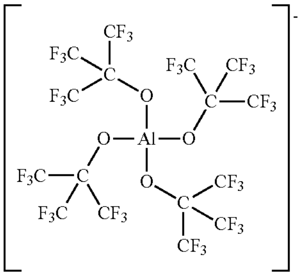 | yes |
| 59 | 860 | 3 | 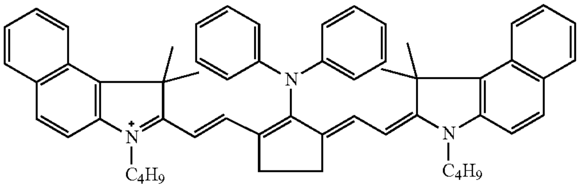 | 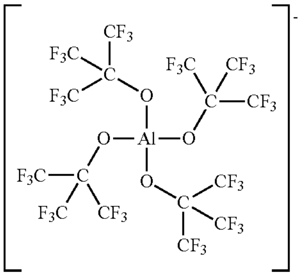 | yes |
| 60 | 860 | 3 | 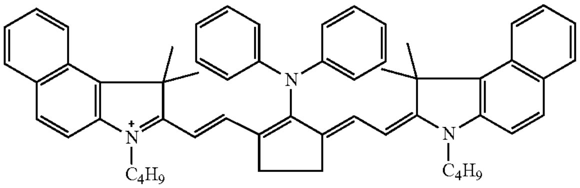 | 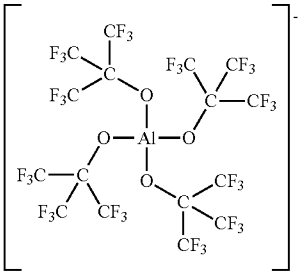 | yes |

TABLE 2-continued
High-Power LED experiments for drying of wire bar coatings applying a LED intensity of 8 W/cm$^2$
| Example | $\lambda_{exc}$ (nm) | Time of residence (min) | absorber cation | respective anion | film formation |
|---|---|---|---|---|---|
| 61 | 860 | 3 | 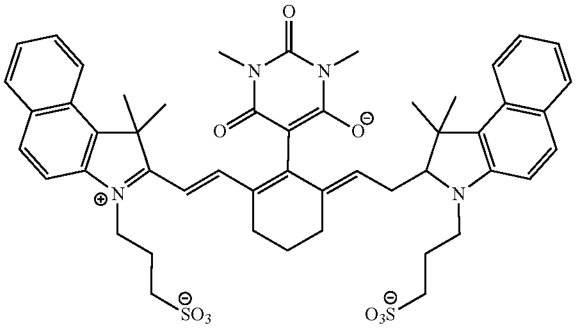<br>2[HN($C_2H_5$)$_3$]$^+$ | | yes |
| 62 | 860 | 3 | 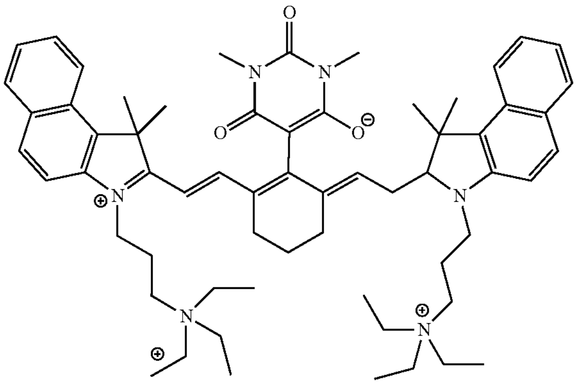 | 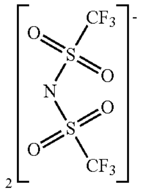 | yes |
| 63 | 860 | 3 | 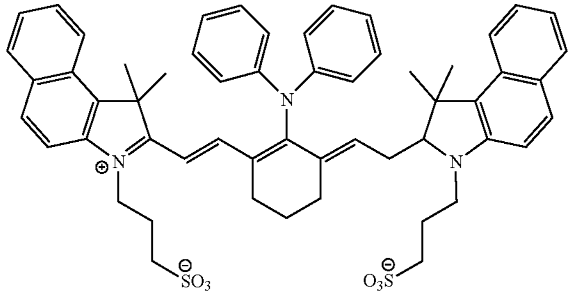<br>[HN($C_2H_5$)$_3$]$^+$ | | yes |
| 64 | 860 | 3 | 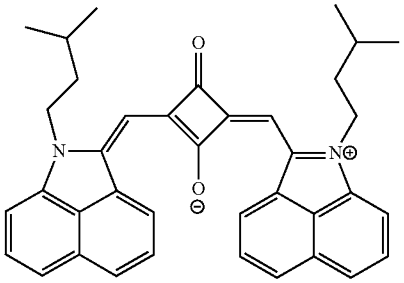 [SMILES: CC(C)CCn1/c(=C/C2=C([O-])C(=C\C3=[N+](CCC(C)C)c4cccc5cccc3c45)/C2=O)c2cccc3cccc1c32] | | yes |

TABLE 2-continued

High-Power LED experiments for drying of wire bar coatings applying a LED intensity of 8 W/cm$^2$

| Example | $\lambda_{exc}$ (nm) | Time of residence (min) | absorber cation | respective anion | film formation |
|---|---|---|---|---|---|
| 65 | 940 | 3 | 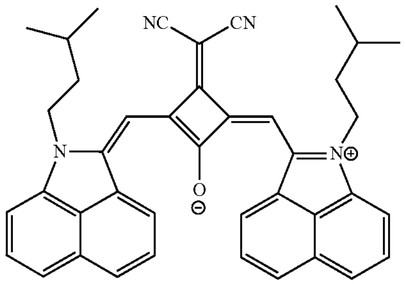 [SMILES: CC(C)CCn1/c(=C/C2=C([O-])C(=C\C3=[N+](CCC(C)C)c4cccc5cccc3c45)/C2=C(C#N)C#N)c2cccc3cccc1c32] | | yes |
| 66 | 940 | 3 | 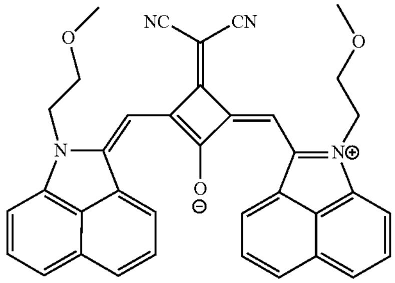 [SMILES: COCCn1/c(=C/C2=C([O-])C(=C\C3=[N+](CCOC)c4cccc5cccc3c45)/C2=C(C#N)C#N)c2cccc3cccc1c32] | | yes |
| 67 | 860 | 3 | 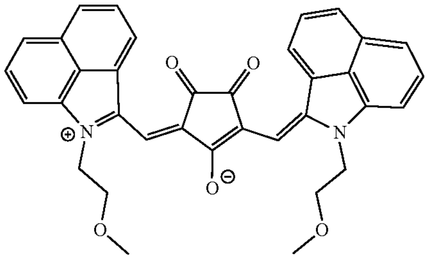 [SMILES: COCCn1/c(=C/C2=C([O-])C(=C/C3=[N+](CCOC)c4cccc5cccc3c45)/C(=O)C2=O)c2cccc3cccc1c32] | | yes |
| 68 | 860 | 3 | 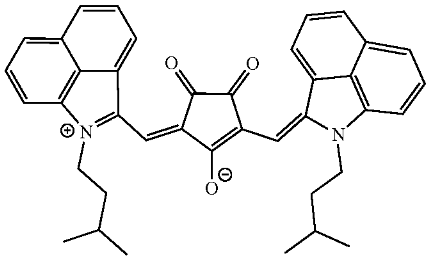 [SMILES: CC(C)CCn1/c(=C/C2=C([O-])C(=C/C3=[N+](CCC(C)C)c4cccc5cccc3c45)/C(=O)C2=O)c2cccc3cccc1c32] | | yes |

The invention claimed is:

1. A method for coating and insulating a wire comprising the following steps:

a) coating the wire by applying a coating composition which comprises an infrared radiation sensitive compound having a maximum absorption in a range of 700 nm to 2,000 nm in wavelength and a matrix which comprises an insulating wire varnish, b) exposing the coated wire to an irradiation source, and c) curing the wire coating to provide an enameled wire, wherein the infrared radiation sensitive compound is selected from the group consisting of polymethines, rylenes, porphyrines, and oxonoles.

2. The method according to claim 1, wherein steps a) to c) are repeated until a predetermined enamel thickness is achieved.

3. The method according to claim 1, wherein the irradiation source comprises a semiconductor emitting in the spectral range of 700 nm to 2,000 nm in wavelength.

4. The method according to claim 3, wherein the irradiation source is selected from the group consisting of semiconductor lasers and high-power LED devices.

5. The method according to claim 1, wherein the infrared radiation sensitive compound is a polymethine compound of one of the following formulas (I), (II), (III), or (IV), (I)

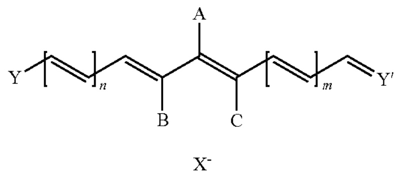

(II)

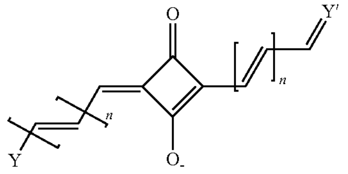

(III)

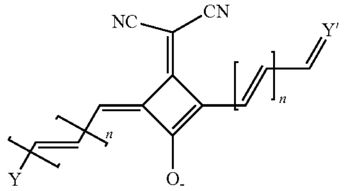

(IV)

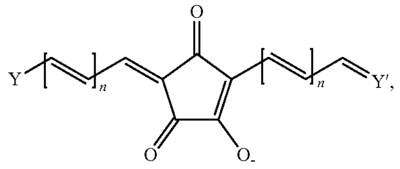

wherein Y is selected from (V)

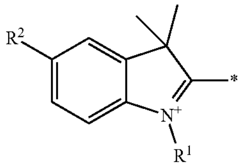

(VI)

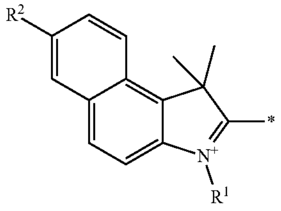

(VII)

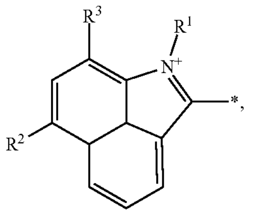

Y' is selected from (VIII)

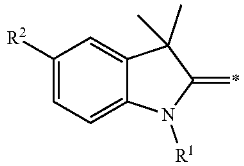

(IX)

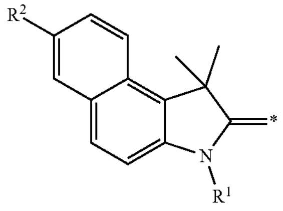

(X)

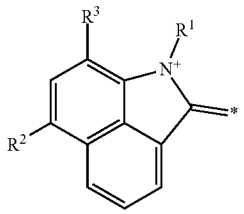

A denotes H, $C_{1-6}$ alkyl, O—$C_{1-6}$ alkyl, barbituryl, aryl, $N(Ph)_2$, S-phenyl, B and C independently from each other denote H, $C_{1-6}$ alkyl, $C_{2-6}$ alkenyl; or B and C together form a 5- or 6-membered carbocycle, $R^1$, $R^2$, and $R^3$ independently from each other denote H, $C_{1-3}$ alkyl, m and n independently from each other denote 0, 1, or 2, and $X^-$ denotes a counter anion.

6. The method according to claim 5, wherein the polymethine compound of formula (I), (II), (III), or (IV) exhibits a solubility in the matrix of at least 0.5 g/L at room temperature.

7. The method according to claim 1, wherein the insulating wire varnish is selected from the group consisting of polyester, THEIC-modified polyester, polyester imide, polyamide imide, polyimide, polyamide, polyurethanes, polyvinyl formal, epoxy, acrylic resin, methacrylic resin, melamine resin, phenolic resin and alkyd resin-based paint.

8. The method according to claim 7, wherein the insulating wire varnish provides for a breakdown voltage of at least 2 kV of the enameled wire.

9. The method according to claim 5, wherein the coating composition is varied by varying the substitution pattern of the polymethine compound of formula (I), (II), (III), or (IV) and/or by varying the counter-anion.

10. A wire coating composition comprising an infrared radiation sensitive compound having a maximum absorption in a range of 700 nm to 2,000 nm in wavelength and a matrix comprising an insulating wire varnish, wherein the infrared radiation sensitive compound is selected from the group consisting of polymethines, rylenes, porphyrines, and oxonoles.

11. The wire coating composition according to claim 10, wherein the infrared radiation sensitive compound is a polymethine compound of one of the following formulas (I), (II), (III), or (IV), (I)

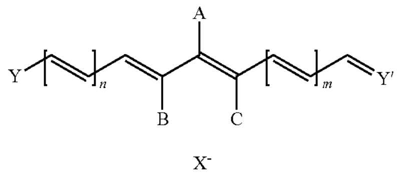

(II)

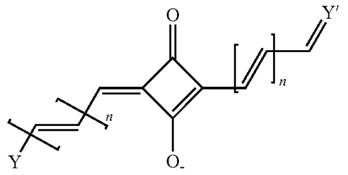

(III)

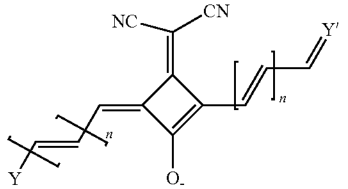

(IV)

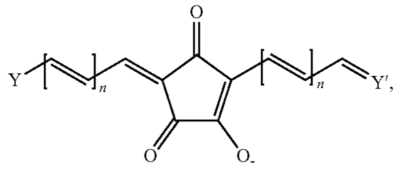

wherein Y is selected from (V)

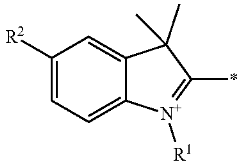

(VI)

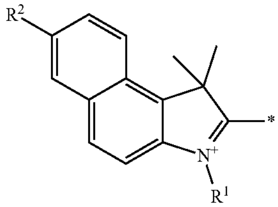

(VII)

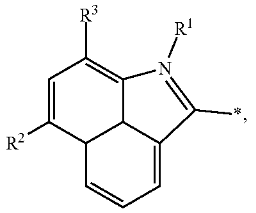

Y' is selected from (VIII)

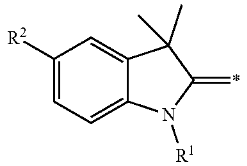

(IX)

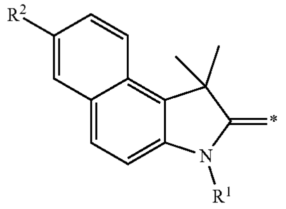

(X)

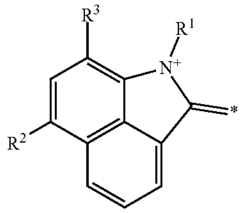

A denotes H, $C_{1-6}$ alkyl, O—$C_{1-6}$ alkyl, barbituryl, aryl, $N(Ph)_2$, S-phenyl, B and C independently from each other denote H, $C_{1-6}$ alkyl, $C_{2-6}$ alkenyl; or B and C together form a 5- or 6-membered carbocycle, $R^1$, $R^2$, and $R^3$ independently from each other denote H, $C_{1-3}$ alkyl, m and n independently from each other denote 0, 1, or 2, and $X^-$ denotes a counter anion.

12. The wire coating composition according to claim 11, wherein the polymethine compound of formula (I), (II), (III), or (IV) exhibits a solubility in the matrix of at least 0.5 g/L at room temperature.

13. The wire coating composition according to claim 10, wherein the composition comprises a mixture of at least two infrared radiation sensitive compounds.

14. The wire coating composition according to claim 10, wherein the insulating wire varnish is a solid or liquid wire varnish.

15. The wire coating composition according to claim 14, wherein the insulating wire varnish is selected from the group consisting of polyester, THEIC-modified polyester, polyester imide, polyamide imide, polyimide, polyamide, polyurethanes, polyvinyl formal, epoxy, acrylic resin, methacrylic resin, melamine resin, phenolic resin and/or alkyd resin-based paint.

16. The wire coating composition according to claim 14, wherein the insulating wire varnish provides for a breakdown voltage of at least 2 kV of an enameled wire.

17. An enameled wire comprising a cured coating composition according to claim 10.

18. The enameled wire according to claim 17, wherein the enameled wire has a breakdown voltage of at least 2 kV.

* * * * *